INVENTOR.
Joseph F. Joy.
BY
ATTORNEY.

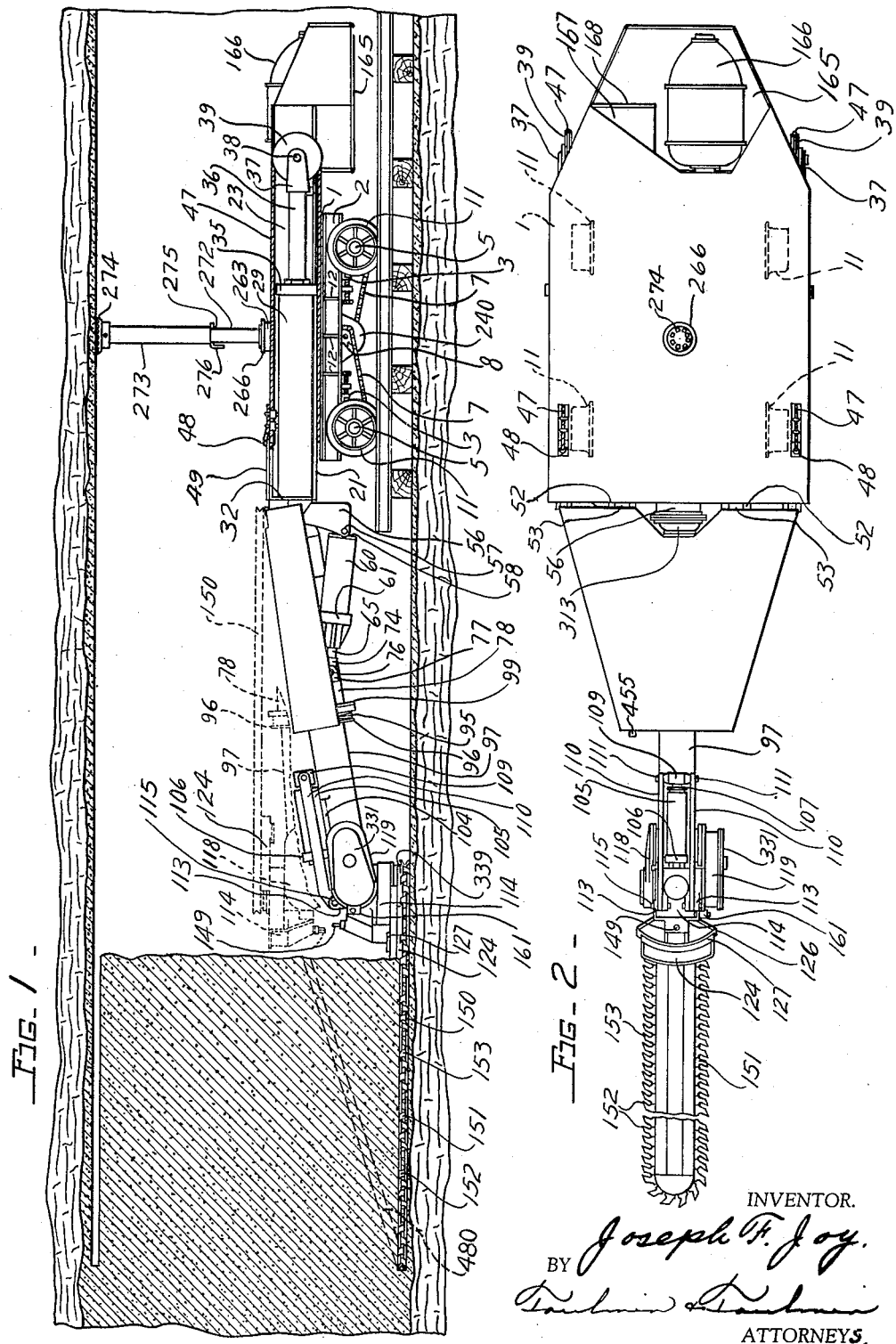

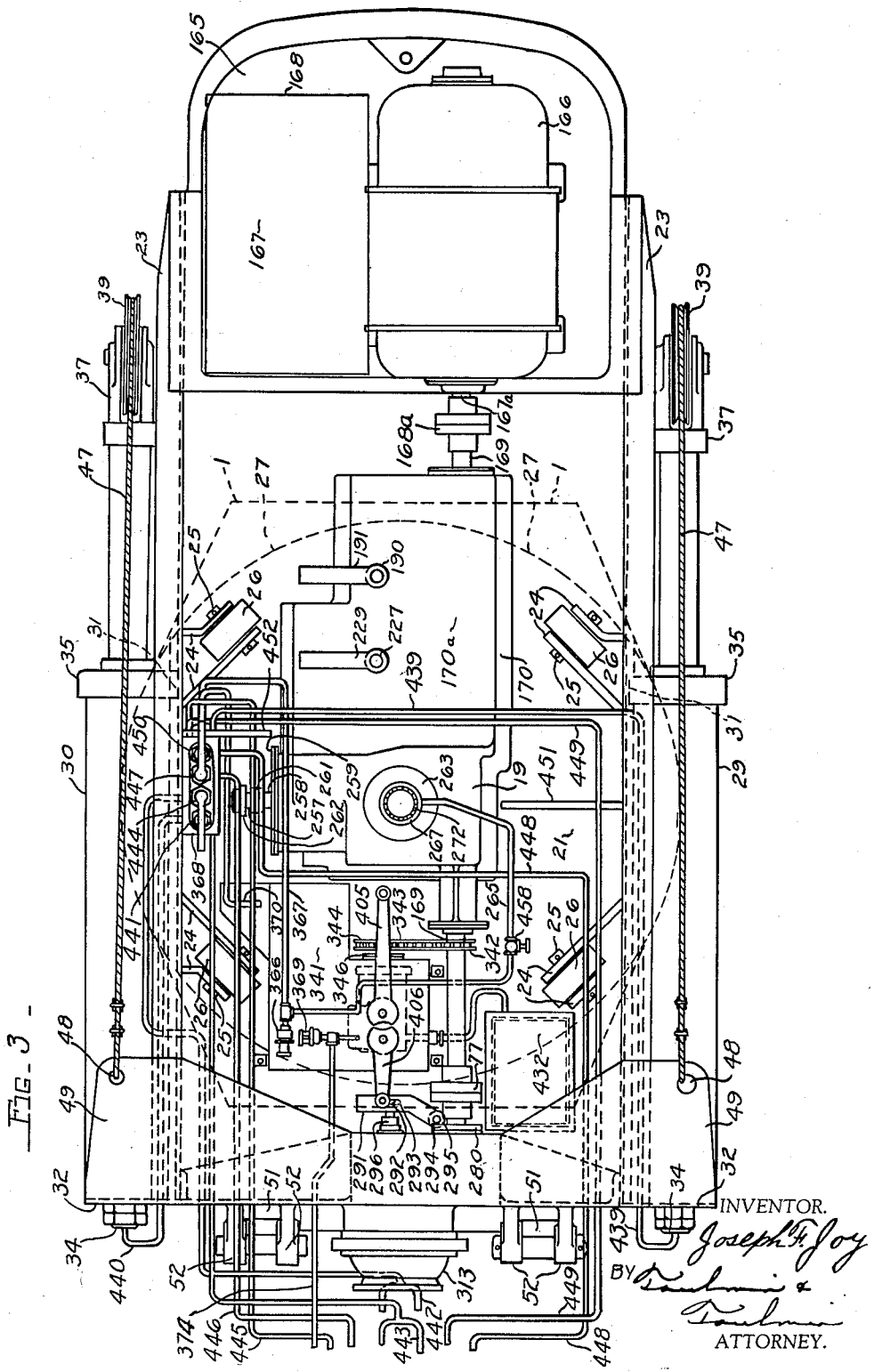

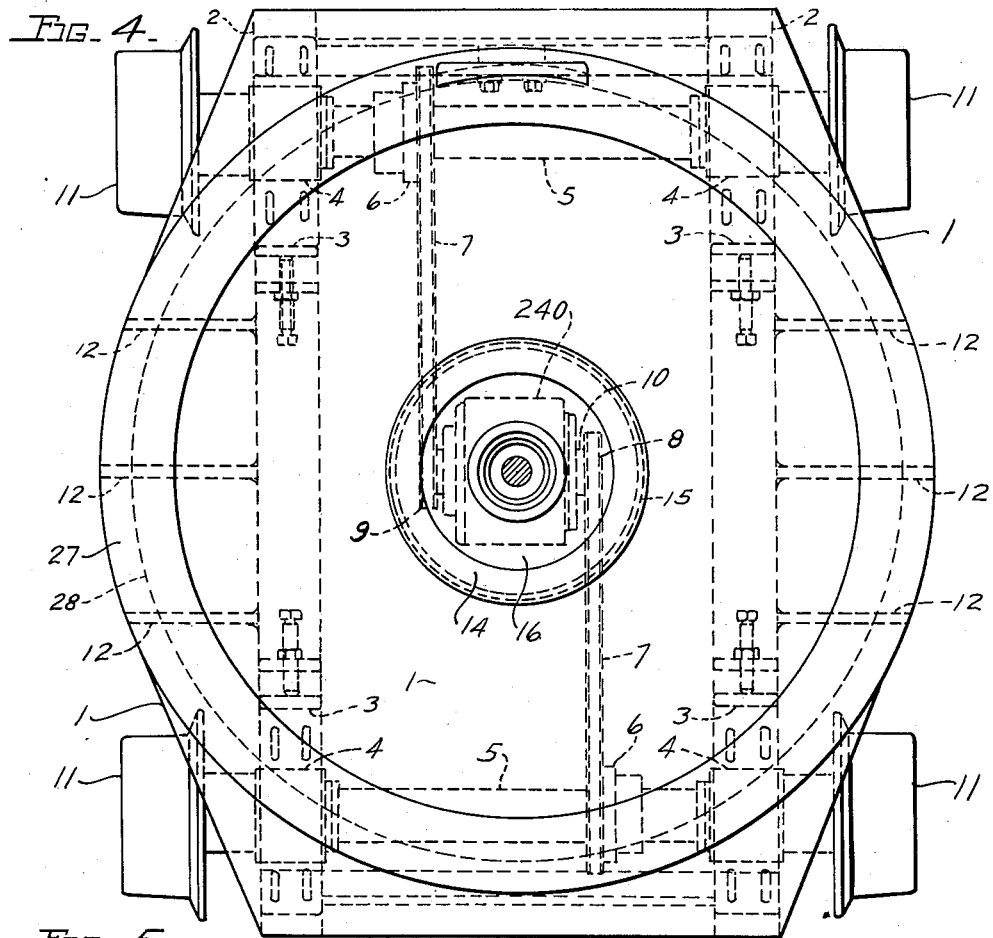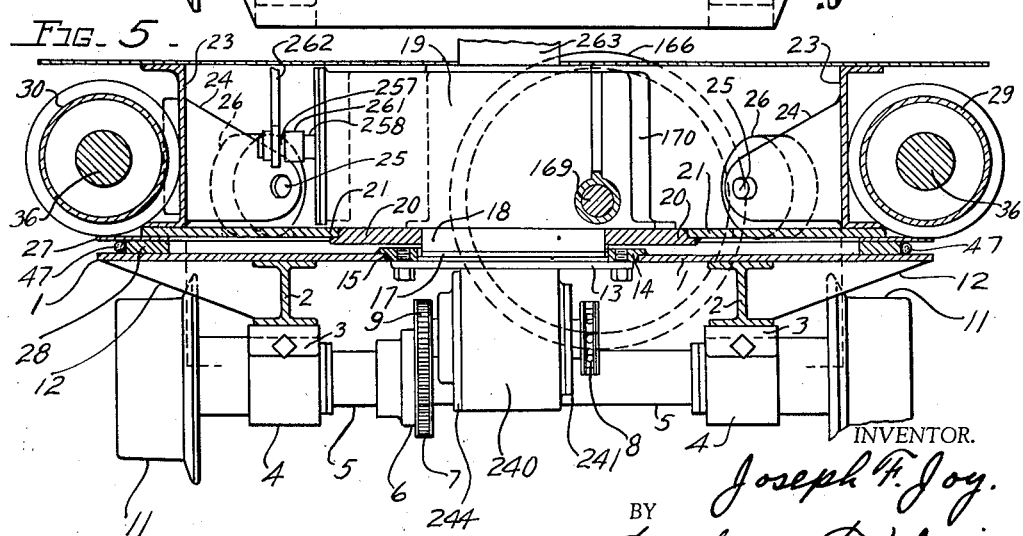

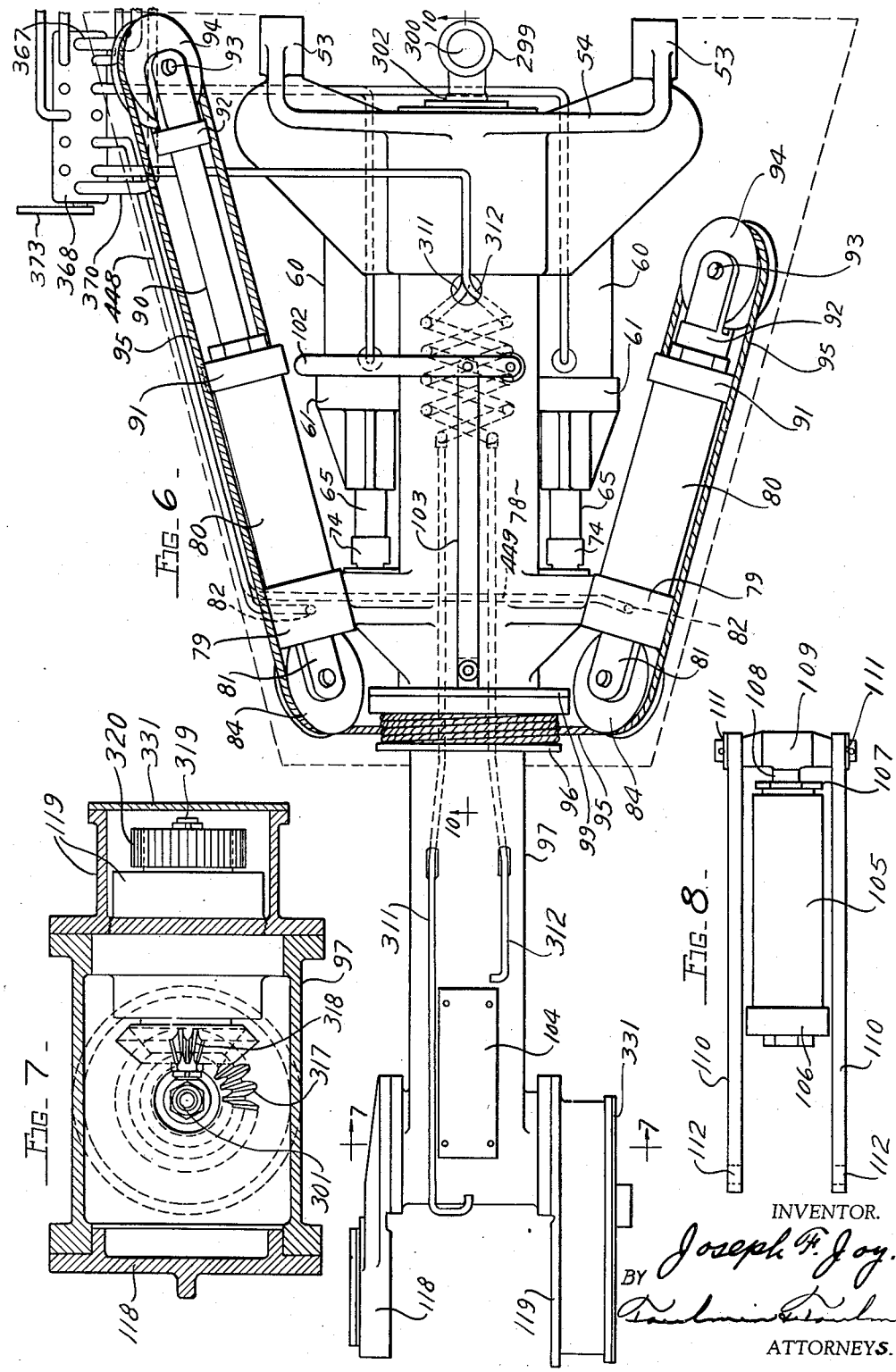

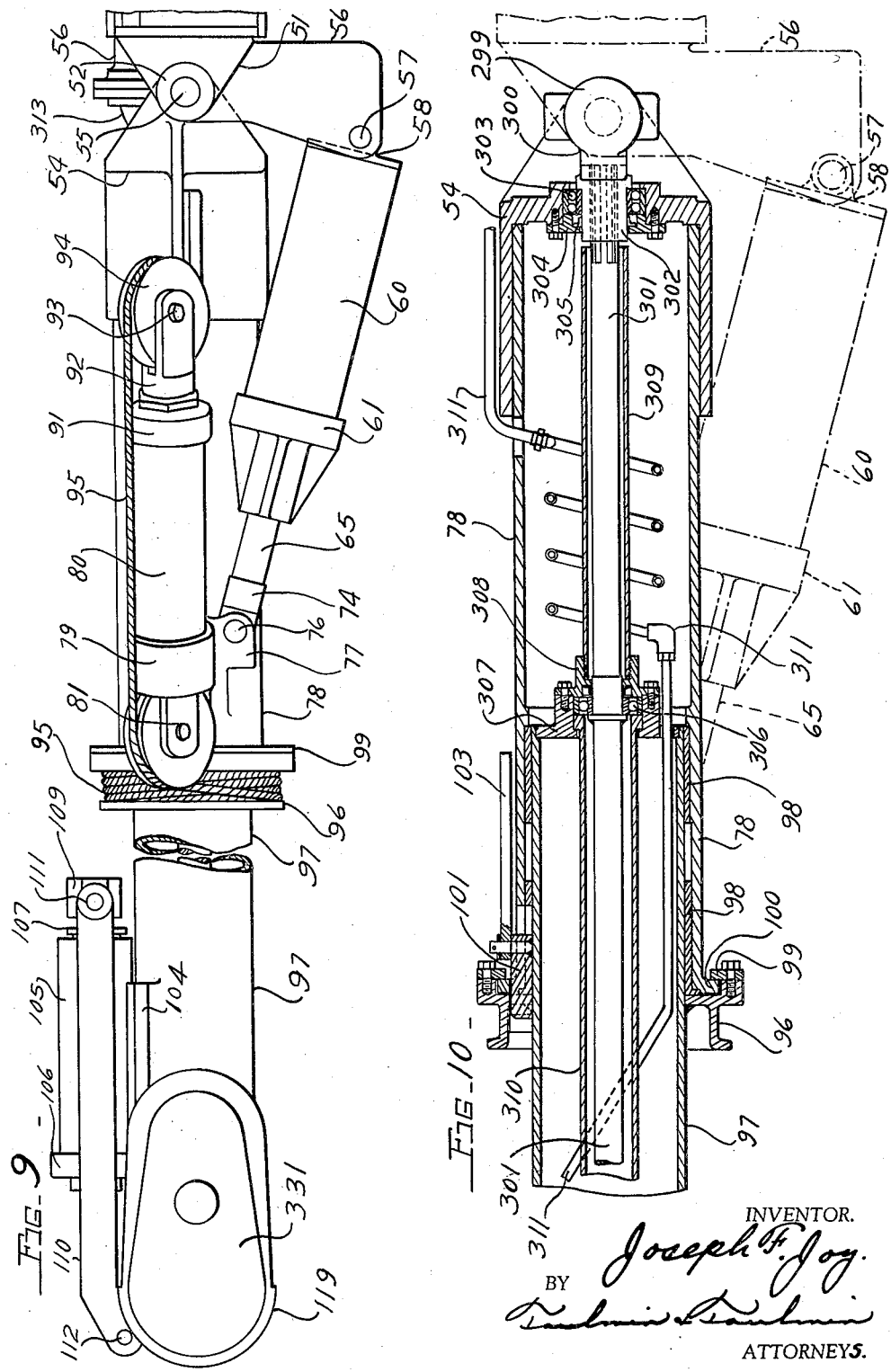

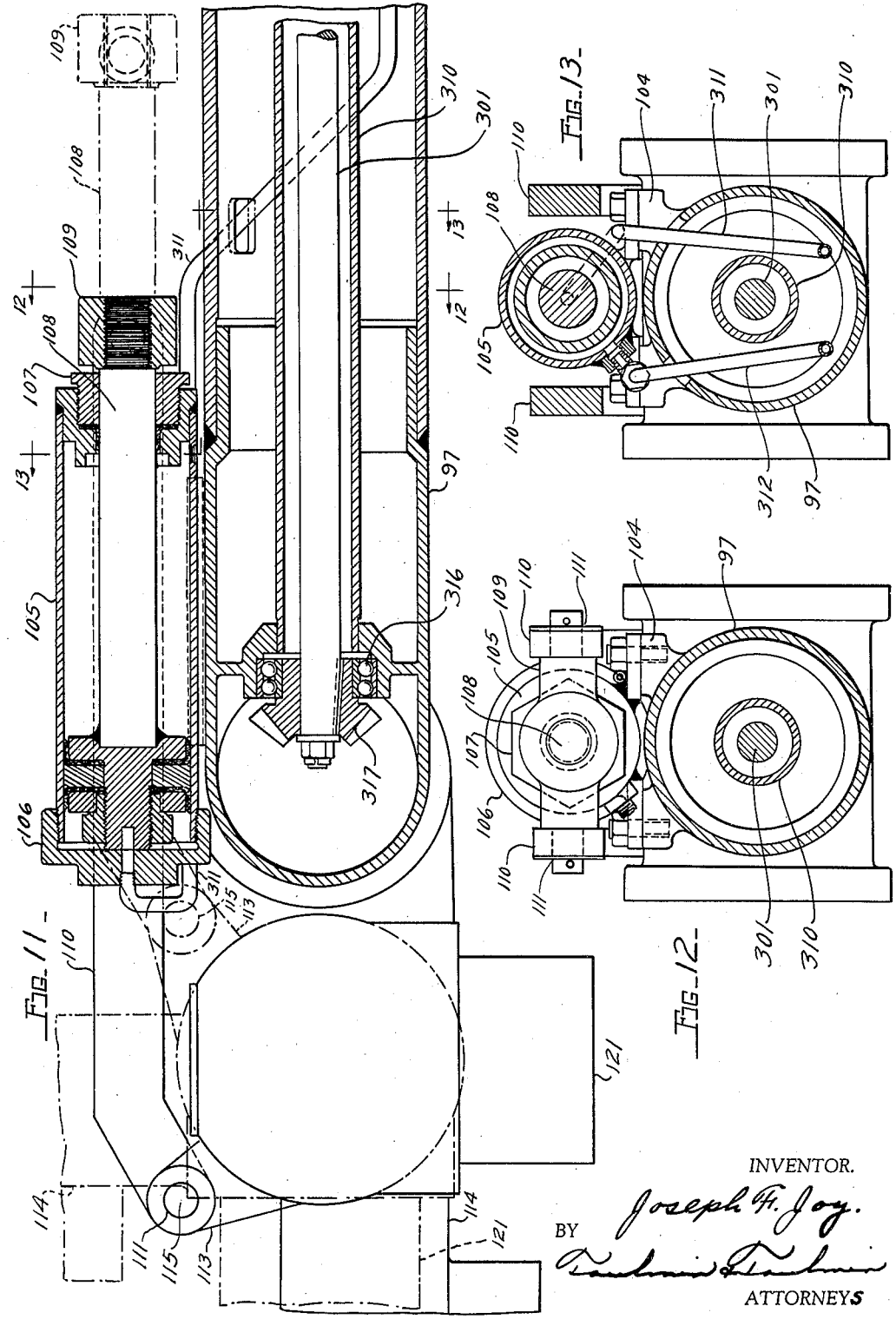

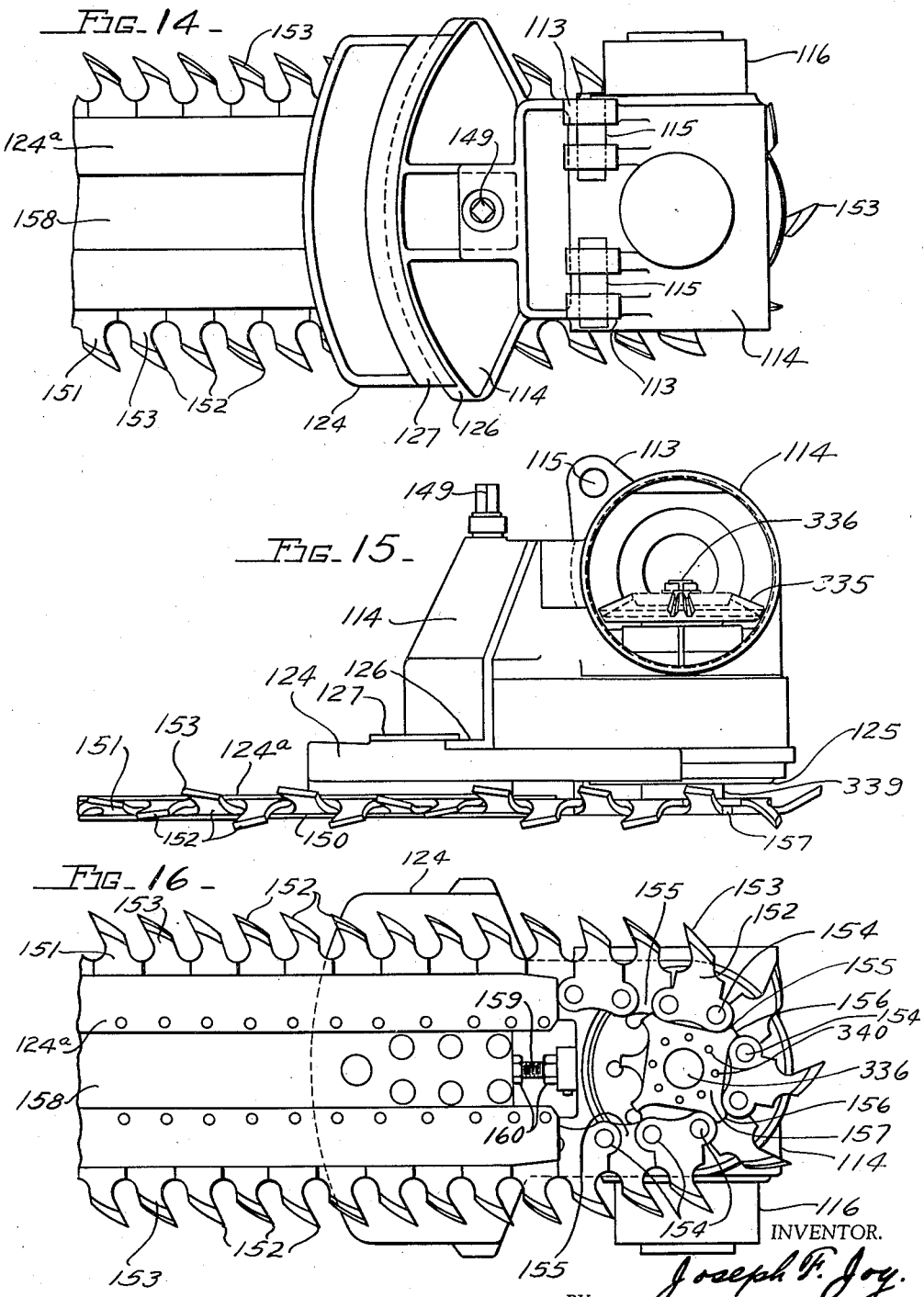

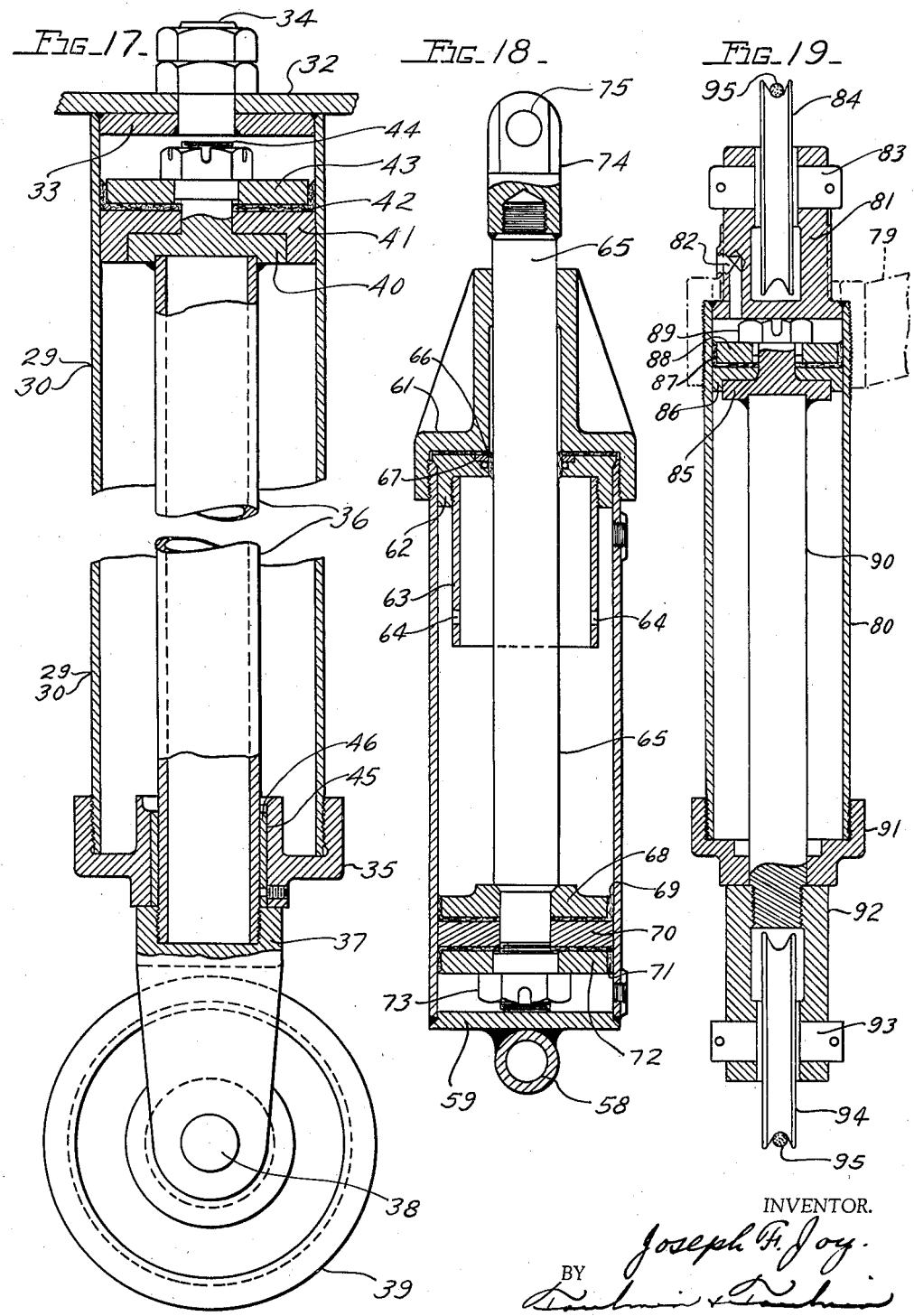

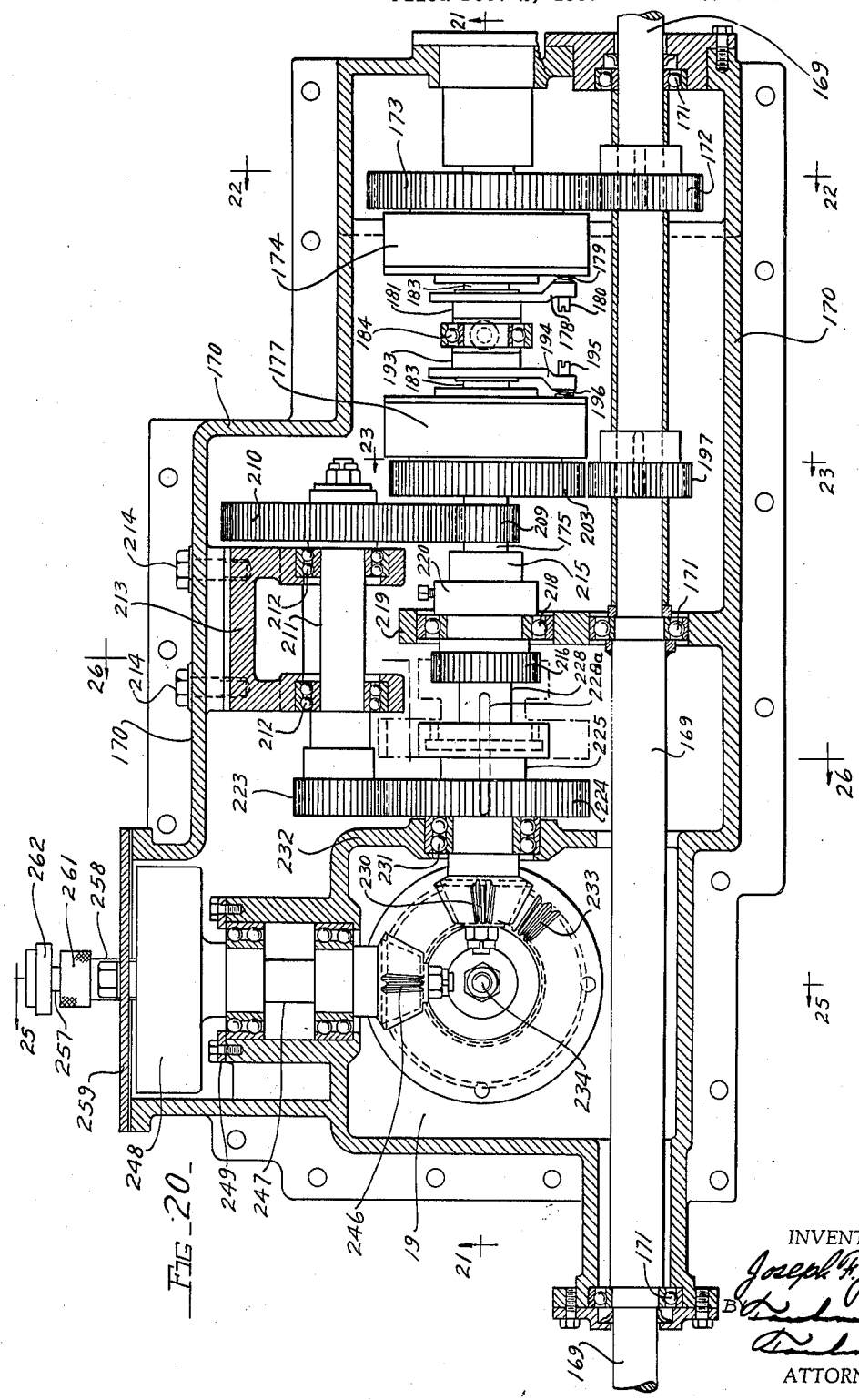

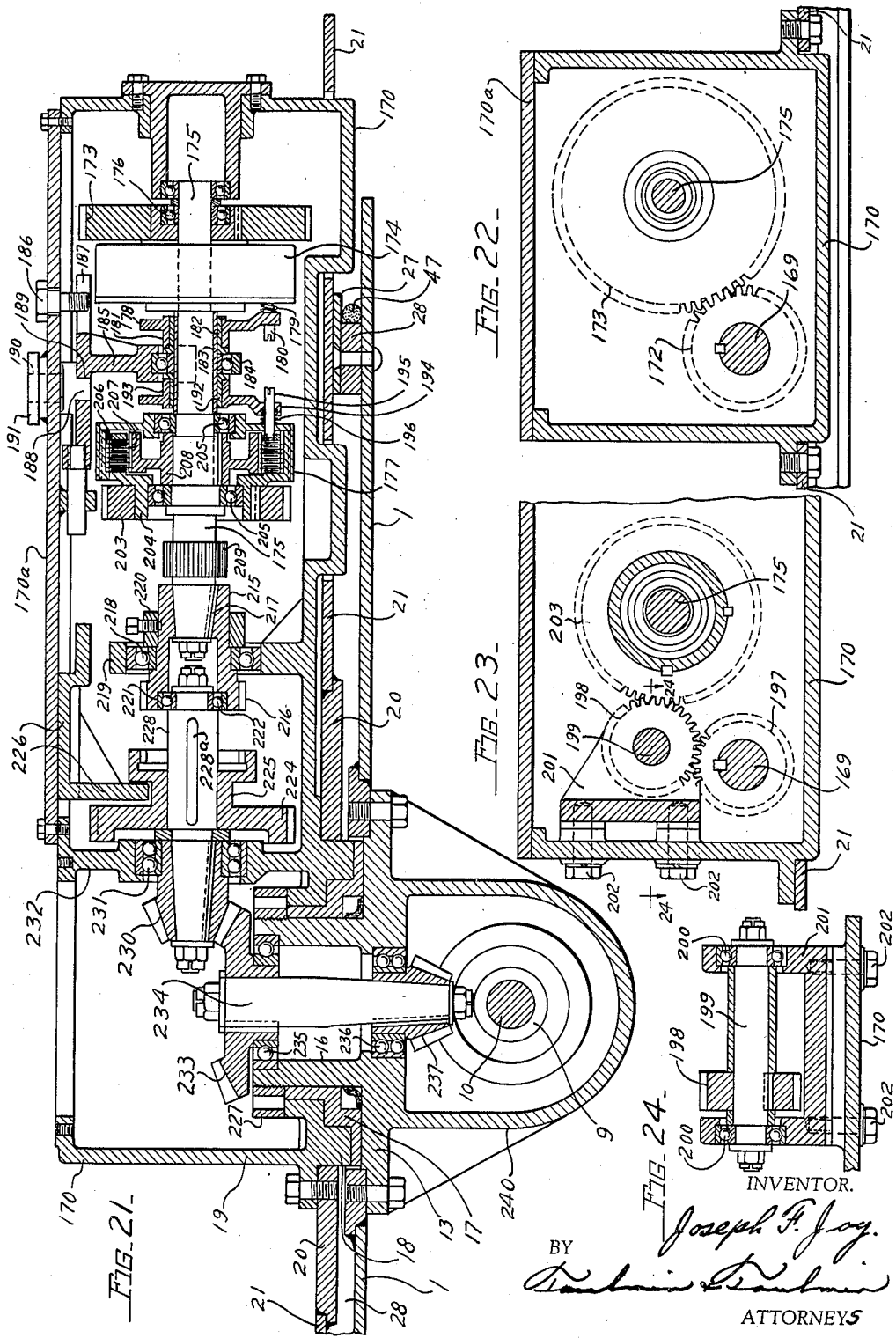

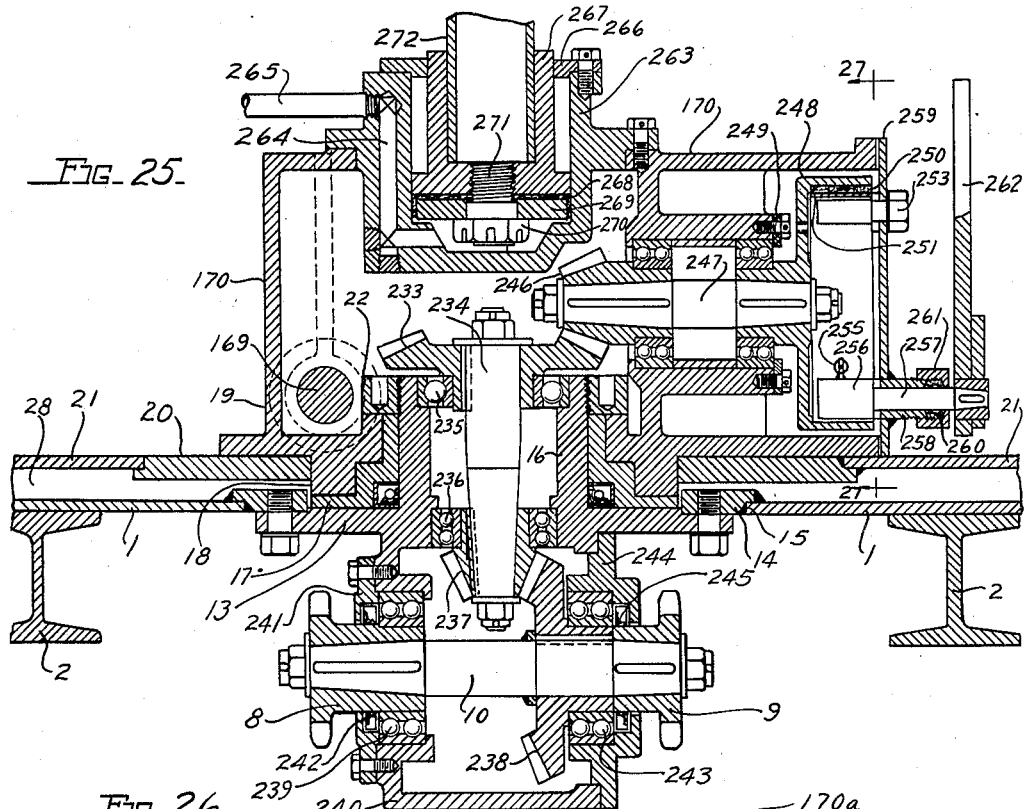
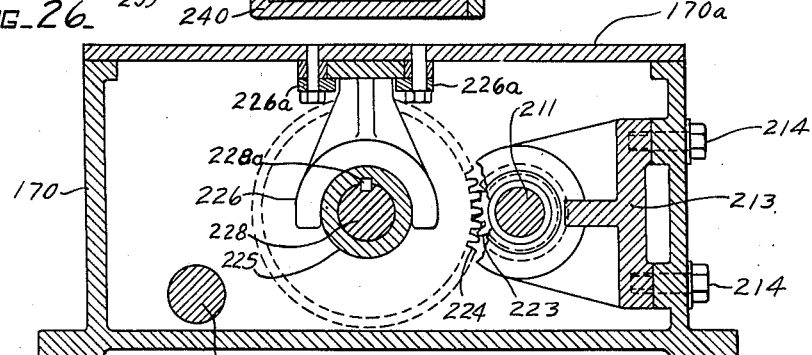
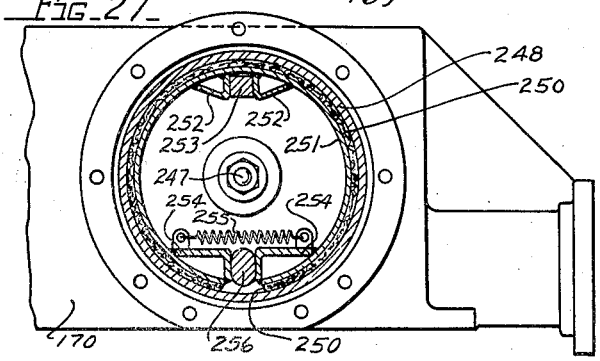

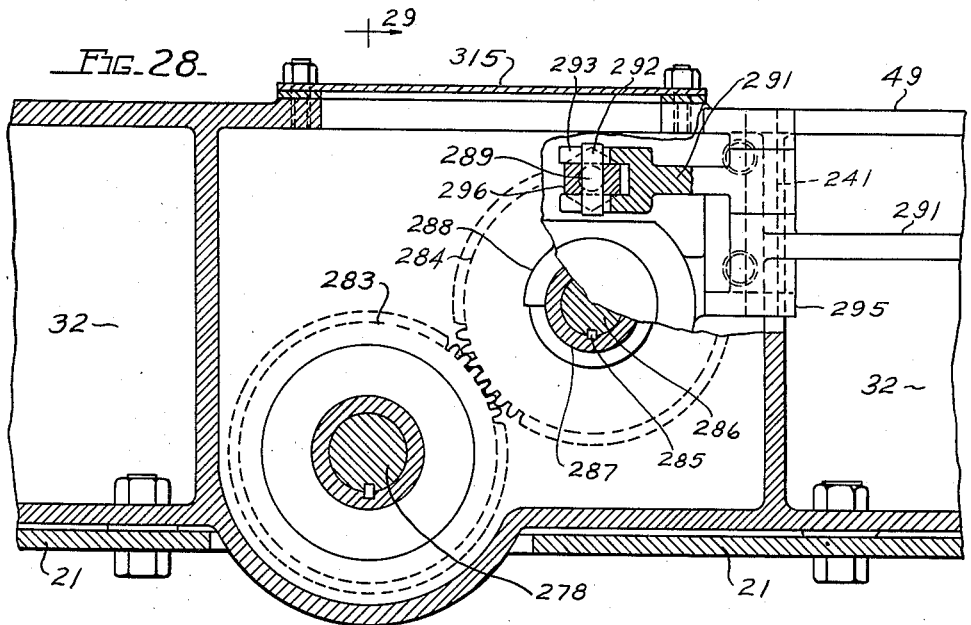
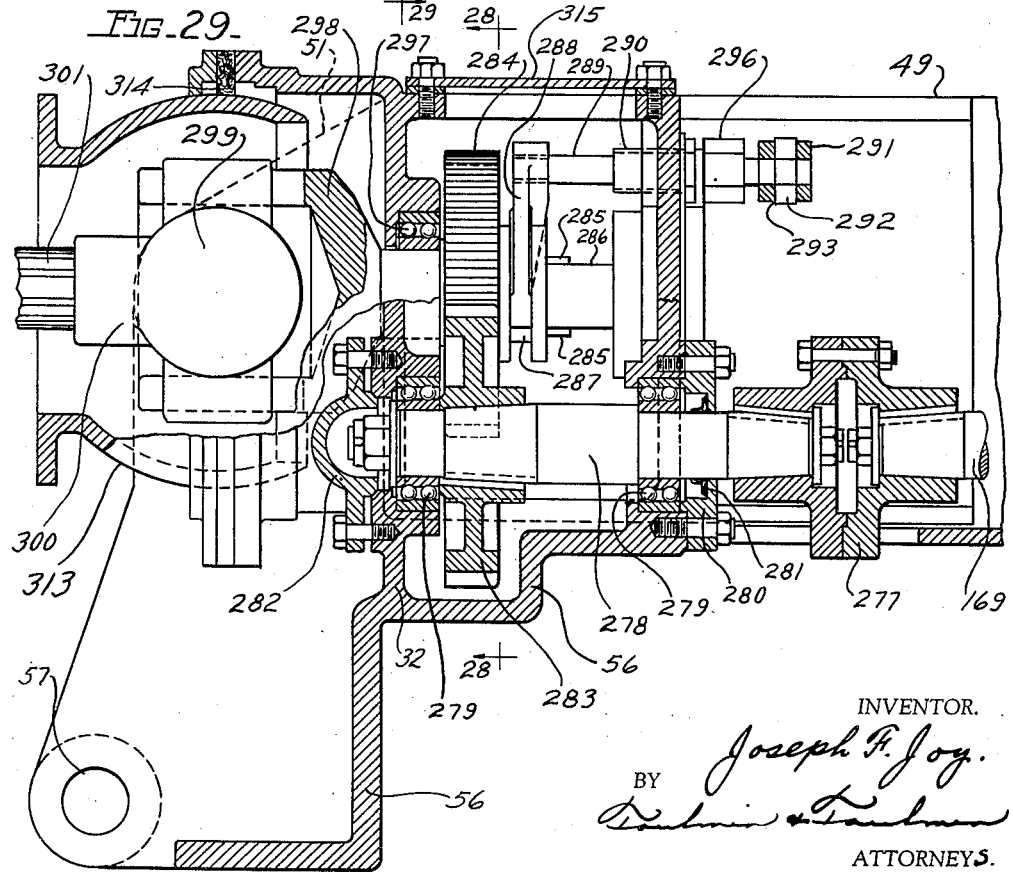

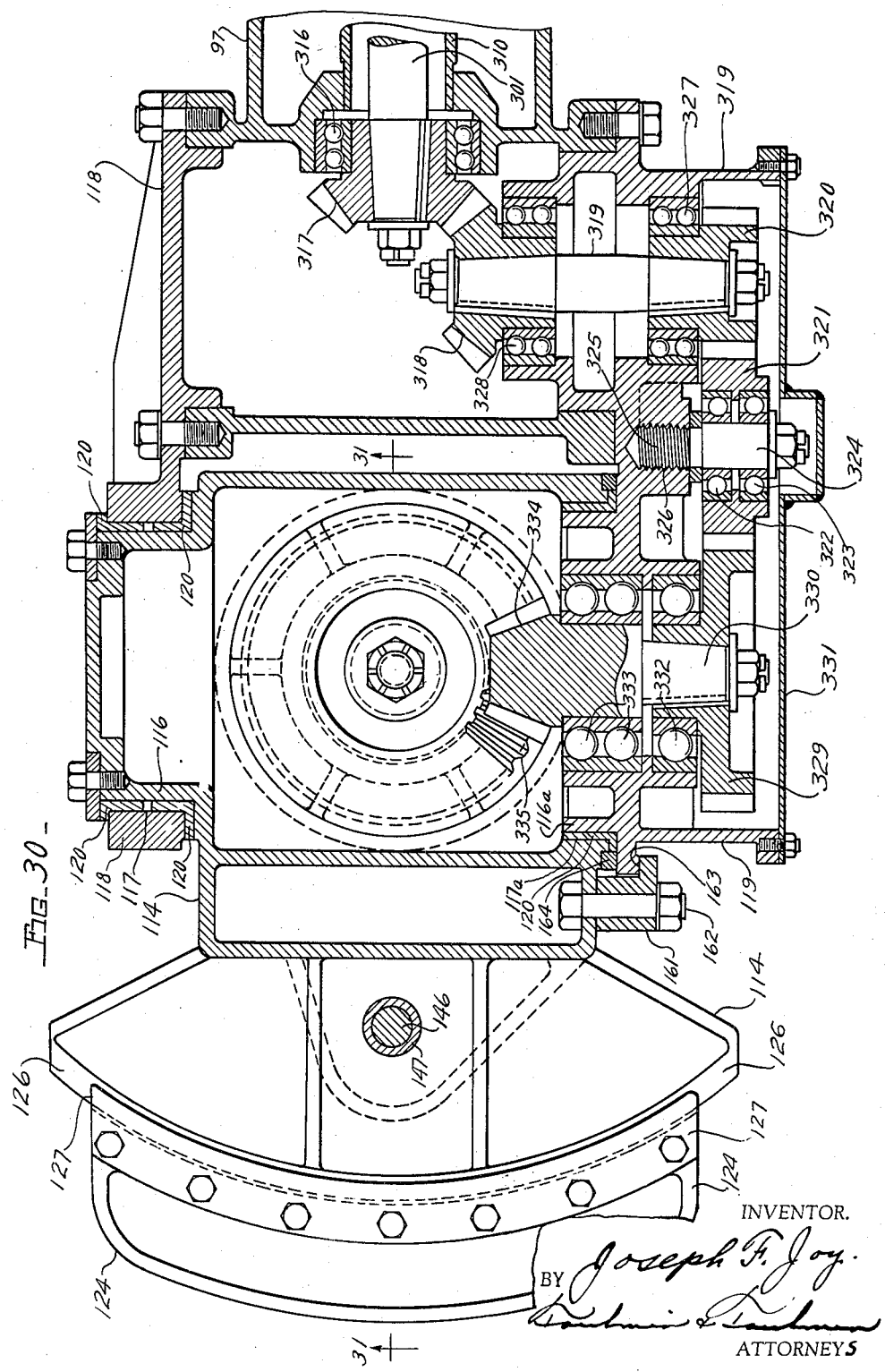

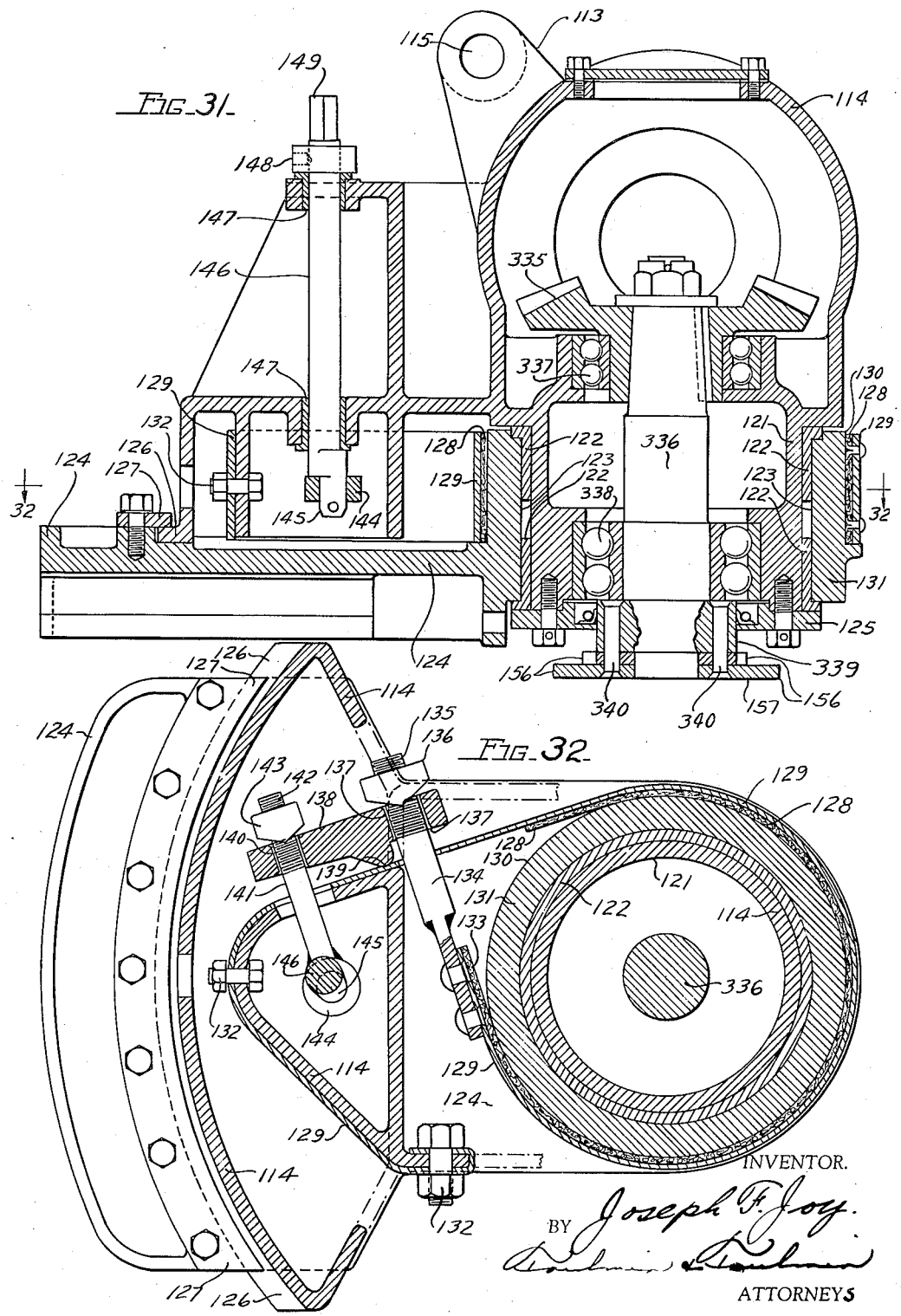

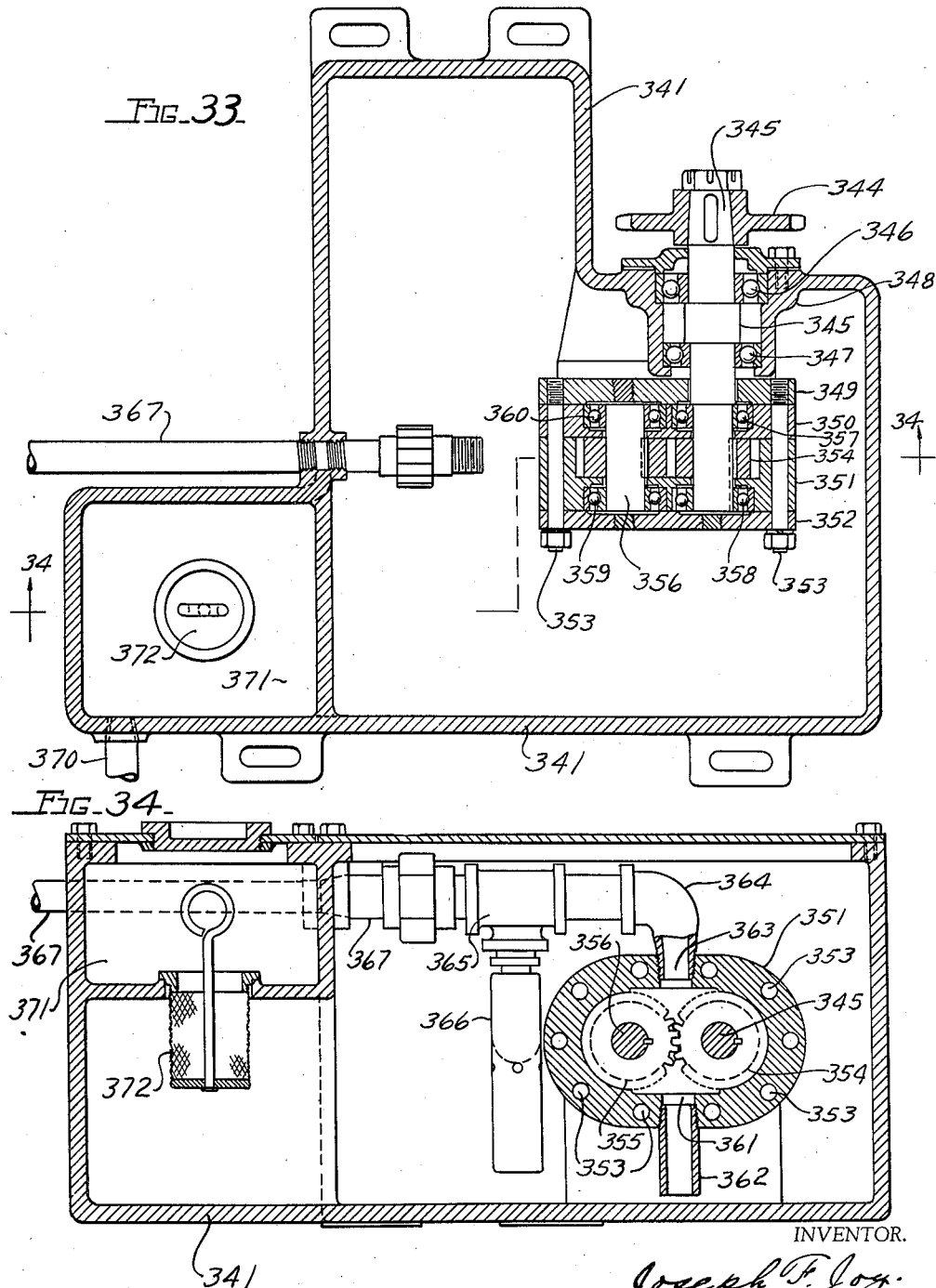

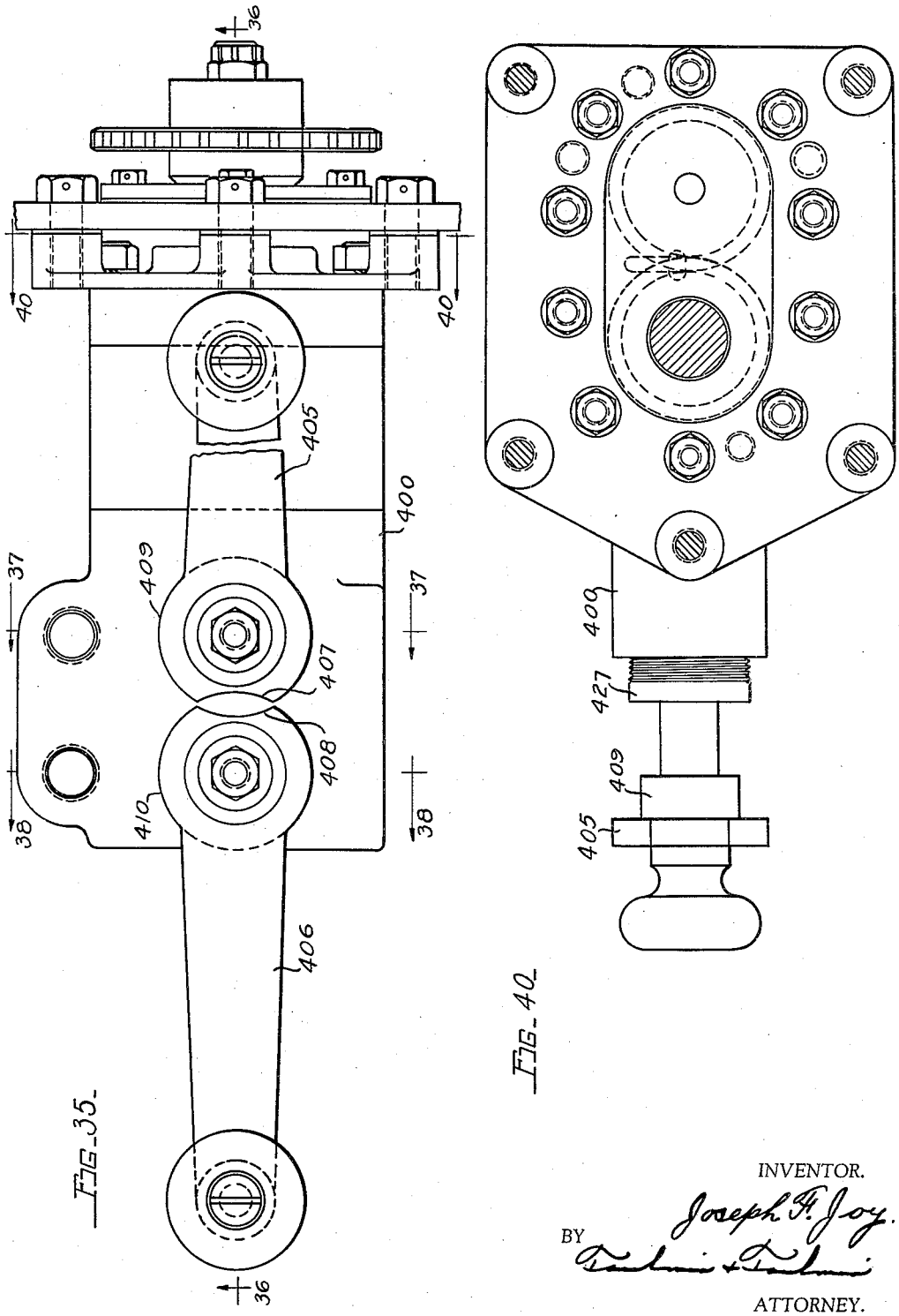

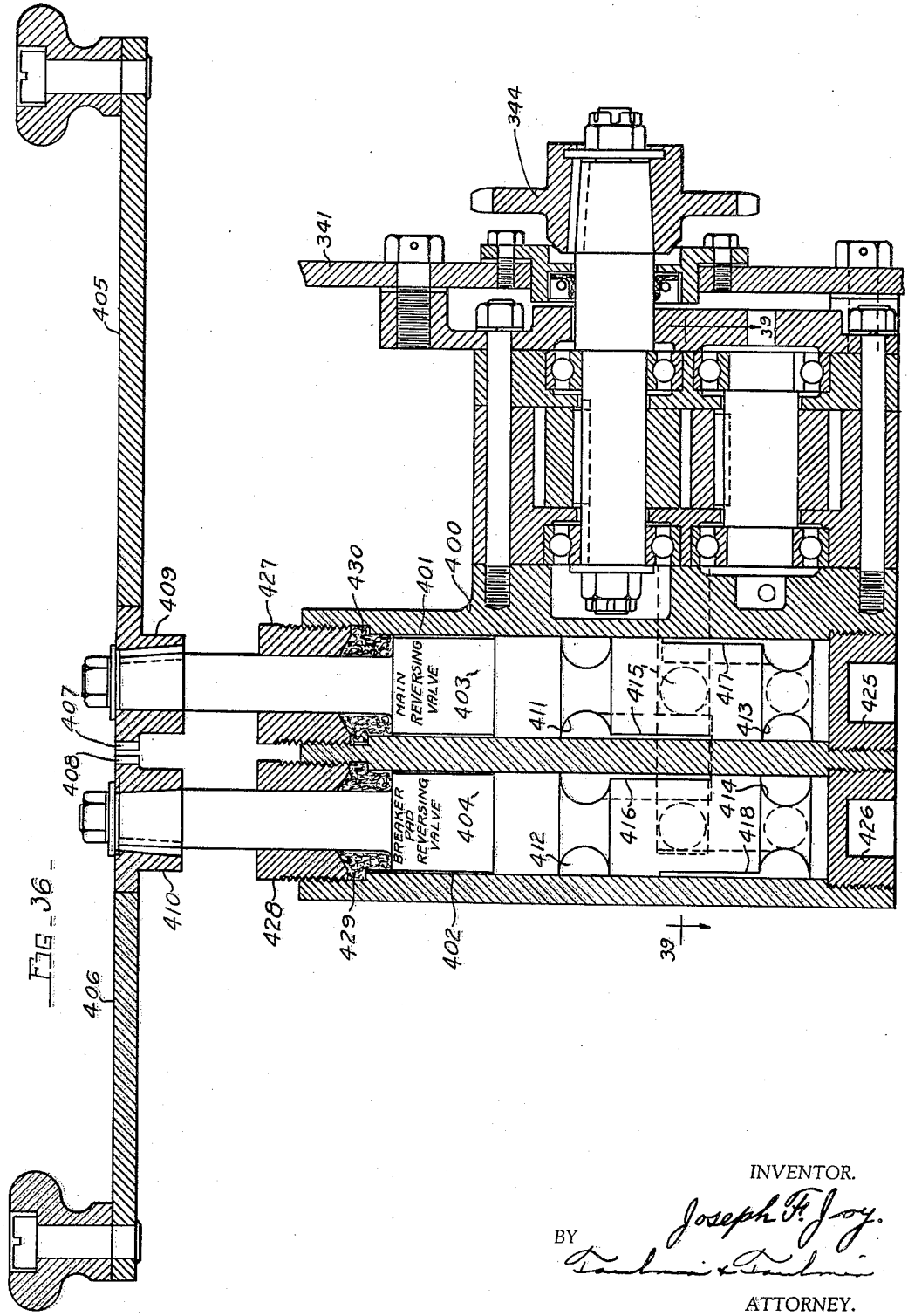

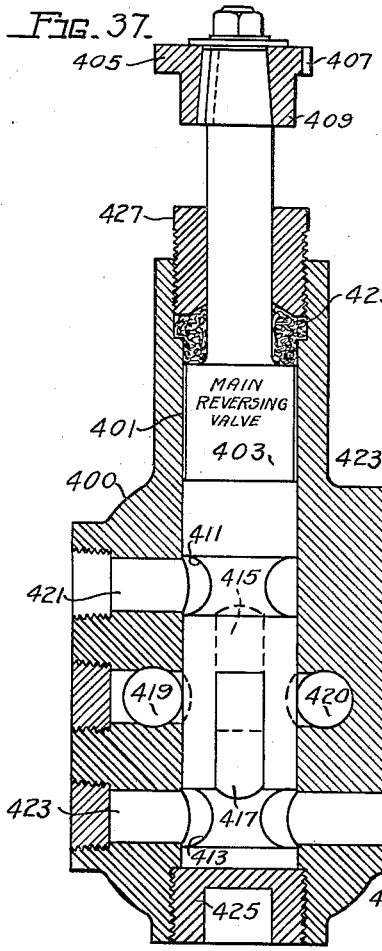
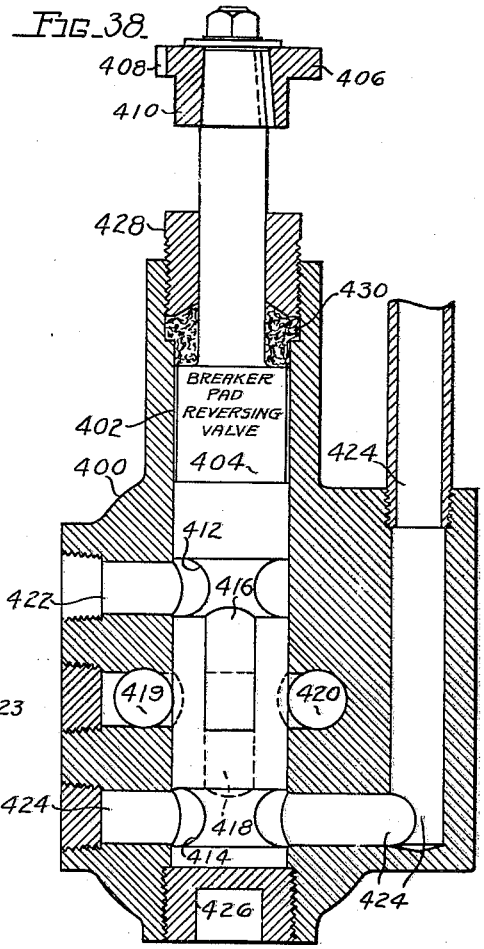
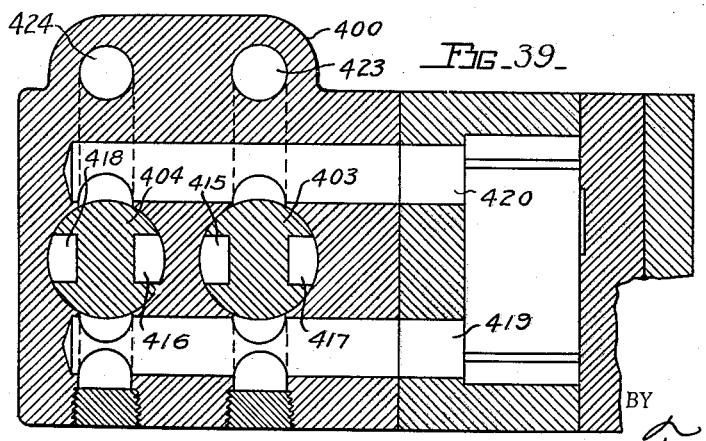

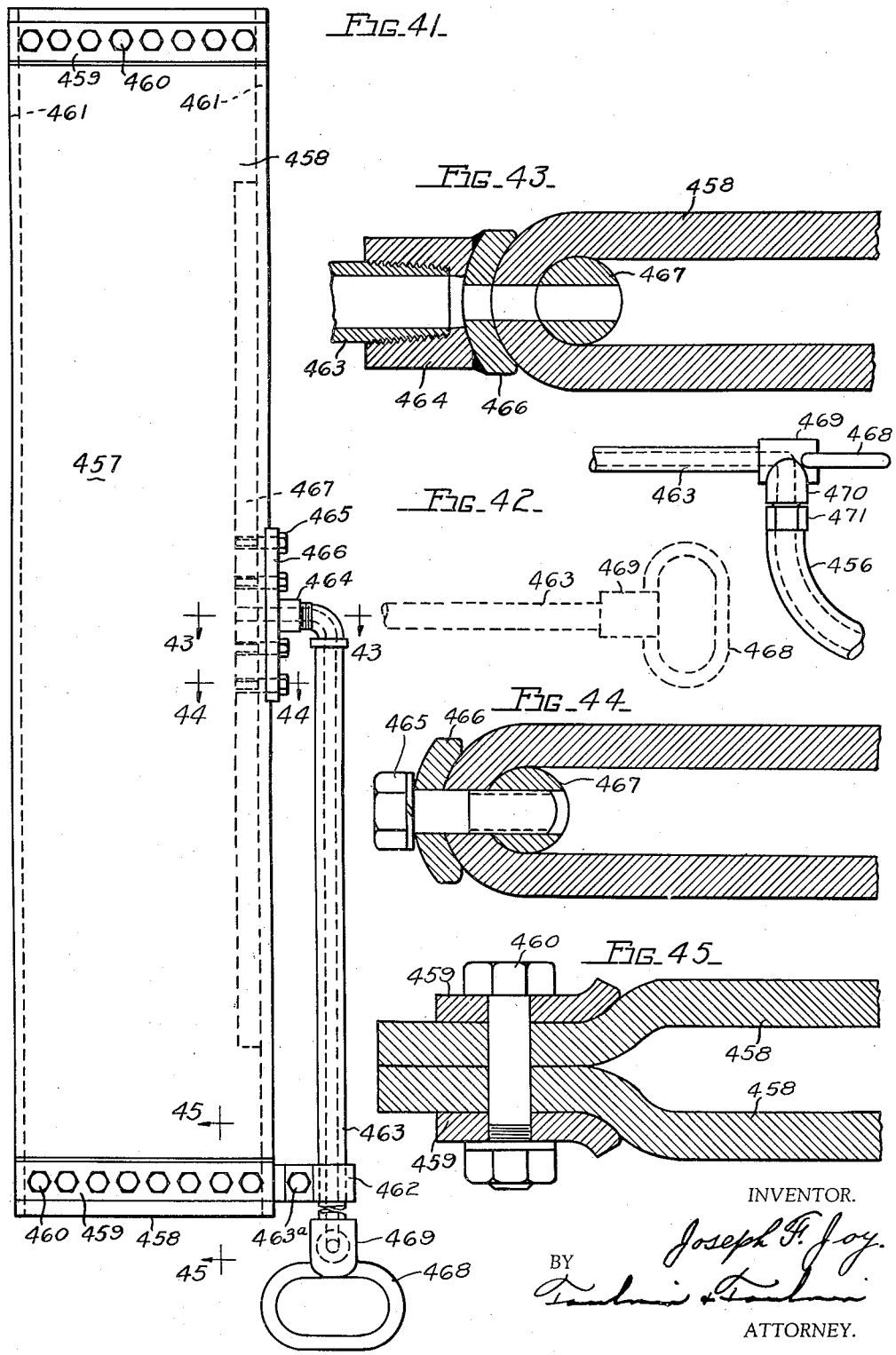

June 20, 1939. J. F. JOY 2,163,341
COAL CUTTING MACHINE
Filed Dec. 2, 1933 23 Sheets-Sheet 21

INVENTOR.
Joseph F. Joy.
BY
ATTORNEY.

June 20, 1939.  J. F. JOY  2,163,341

COAL CUTTING MACHINE

Filed Dec. 2, 1933   23 Sheets—Sheet 22

INVENTOR.
Joseph F. Joy.
BY
ATTORNEY.

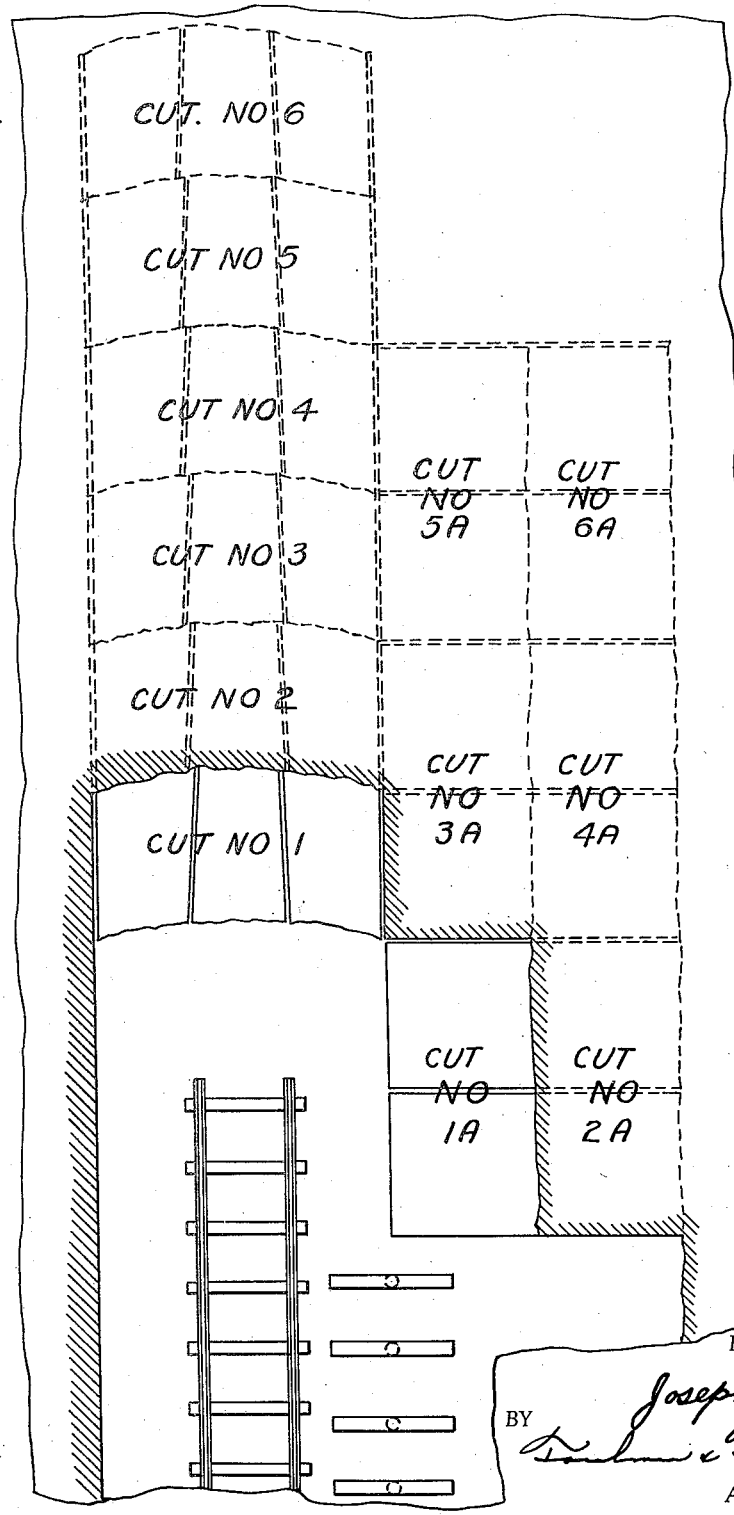

Patented June 20, 1939

2,163,341

BEST AVAILABLE COPY

UNITED STATES PATENT OFFICE 2,163,341

COAL CUTTING MACHINE

Joseph F. Joy, Marion, Ohio, assignor to Sullivan Machinery Company, Chicago, Ill., a corporation of Massachusetts Application December 2, 1933, Serial No. 700,681

28 Claims. (Cl. 262—28)

My invention relates to cutting machines and, in particular, to coal cutting machines arranged to cut kerfs in a coal vein within a mine.

An object of my invention is to provide a coal cutting machine whereby the face of the coal working place is divided into blocks or cubes which are subsequently dislodged by a pressure device attached to and operated by the machine.

Another object of my invention is to provide a universally adjustable coal cutting machine which may be adapted to meet the conditions of the work in a quick and efficient manner and cut kerfs on any level in either a horizontal or a vertical direction.

Another object is to provide means for the quick and convenient operation of the pressure device used to dislodge the blocks of cut coal.

Another object is to provide means for the subsequent withdrawal of the cut and dislodged blocks of coal.

Another object is to provide a coal cutting machine mounted for pivotal movement around a longitudinally movable truck base.

Another object is to provide such a machine having a single motor with driving connections for propulsion or longitudinal feeding of the truck and driving a fluid pressure pump which controls the other major movements of the machine by fluid pressure means.

Another object is to provide such a machine with a cutter blade arranged to be folded back over the machine when the machine is not in use, thereby enhancing the safety and compactness of the machine.

Another object is to provide such a machine wherein the major parts are so distributed that the balance of the machine is improved.

Another object is to provide such a machine with a centralization of controls whereby a single operator may be enabled to control all the major movements of the machine without moving from a single control location.

Another object is to provide such a machine having a cutter blade mounted on a boom, the blade being tiltable relative to the boom, the boom tiltable relative to the truck and one part of the boom rotatable relative to the other part so that the blade may cut either horizontal or vertical slots.

It is my object to provide a hydraulically operated turn-table, boom and cutter head adjustment without disturbing the mechanical operation of the cutter; and preferably use a single motor as a source of power for operating the mechanism and moving it from place to place; to provide such a machine in which the weight of the motor will be balanced against the weight of the boom.

Other objects and purposes will be made apparent from the following description taken in connection with the drawings and appended claims.

In the drawings:

Figure 1 is a side elevation of the cutting machine of my invention, showing the cutter making a bottom slot: the position of the cutter blade during periods of inactivity is shown by the dotted lines.

Figure 2 is a plan view of the machine in the position shown in Figure 1.

Figure 3 is an enlarged plan view of the main swinging frame or turntable of the machine, with the hood removed, showing the arrangement of the hydraulic pump and system, also the mechanical operating system.

Figure 4 is a plan view of the truck serving as a base for the machine, with the turntable and its supported mechanism removed.

Figure 5 is a vertical cross section through the machine along the line 5—5 of Figure 3.

Figure 6 is an enlarged plan view of the boom and its connections as shown in Figure 2, but with the boom cover plate removed.

Figure 7 is a cross section along the line 7—7 of Figure 6, showing the connection of the boom with the cutter head.

Figure 8 is a detail plan view of the cutter head tilting ram removed from its base plate in Figure 6.

Figure 9 is an enlarged side elevation of the boom and its connections shown in Figure 6.

Figure 10 is a central vertical section through the boom along the line 10—10 of Figure 6.

Figure 11 is a central vertical section through the boom and the cutter head tilting ram.

Figure 12 is a cross sectional view through the boom along the line 12—12 of Figure 11.

Figure 13 is a cross sectional view through the boom along the line 13—13 of Figure 11.

Figure 14 is a plan view of the exterior of the cutter head and cutter blade.

Figure 15 is a side elevation, partly in section, of the cutter head and cutter blade shown in Figure 14.

Figure 16 is a view of the opposite side of the cutter head and cutter blade as shown in Figure 14.

Figure 17 is a partial central section through one of the turntable actuating rams.

Figure 18 is a partial central section through one of the boom lifting rams.

Figure 19 is a partial central section through one of the cutter head rotating rams.

Figure 20 is a plan view, partly in section, of the change-speed assembly with the cover plate thereof removed.

Figure 21 is a central vertical section through the change-speed assembly.

Figure 22 is a cross section along the line 22—22 of Figure 20.

Figure 23 is a cross section along the line 23—23 of Figure 20.

Figure 24 is a cross section along the line 24—24 of Figure 23.

Figure 25 is a cross section along the line 25—25 of Figure 20, showing details of the truck-propelling mechanism.

Figure 26 is a cross section along the line 26—26 of Figure 20.

Figure 27 is a cross section along the line 27—27 of Figure 25, showing details of the brake on the truck-propelling mechanism.

Figure 28 is a cross section along the line 28—28 in Figure 29.

Figure 29 is a longitudinal vertical section along the line 29—29 of Figure 28, showing details of the driving connection between the truck and the boom.

Figure 30 is a horizontal section through the cutter head, taken through the axis of the boom drive shaft.

Figure 31 is a central vertical section through the cutter head along the line 31—31 in Figure 30.

Figure 32 is a horizontal section through the line 32—32 of Figure 31, showing details of the cutter head brake.

Figure 33 is a horizontal section through a modified form of fluid pressure pump and tank, taken in a plane through the axis of the pump drive shaft with the reversing valves.

Figure 34 is a vertical section along the irregular line 34—34 in Figure 33.

Figure 35 is a plan view of a preferred form of the pump and main control valves shown in Fig. 3.

Figure 36 is a vertical section along the line 36—36 in Figure 35.

Figure 37 is a vertical section along the line 37—37 of Figure 35.

Figure 38 is a vertical section along the line 38—38 of Figure 35.

Figure 39 is a horizontal section through the line 39—39 of Figure 36.

Figure 40 is a vertical section along the line 40—40 of Figure 35.

Figure 41 is a plan view of the hydraulic breaker pad and rigid conduit leading therefrom.

Figure 42 is a view of the breaker pad handle showing a section of rigid conduit and a section of flexible conduit attached thereto.

Figure 43 is a partial cross section along the line 43—43 of Figure 41 of the breaker pad showing the means of attaching the rigid conduit.

Figure 44 is another section of the breaker pad along the line 44—44 of Figure 41 showing the method of attaching the rigid conduit thereto.

Figure 45 is a section through the end of the breaker pad along the line 45—45 of Figure 41, showing the manner in which the ends are closed.

Figure 51 shows a modification of my method of mining chambers by slot-forming operations.

General construction summarized

Figure 46:
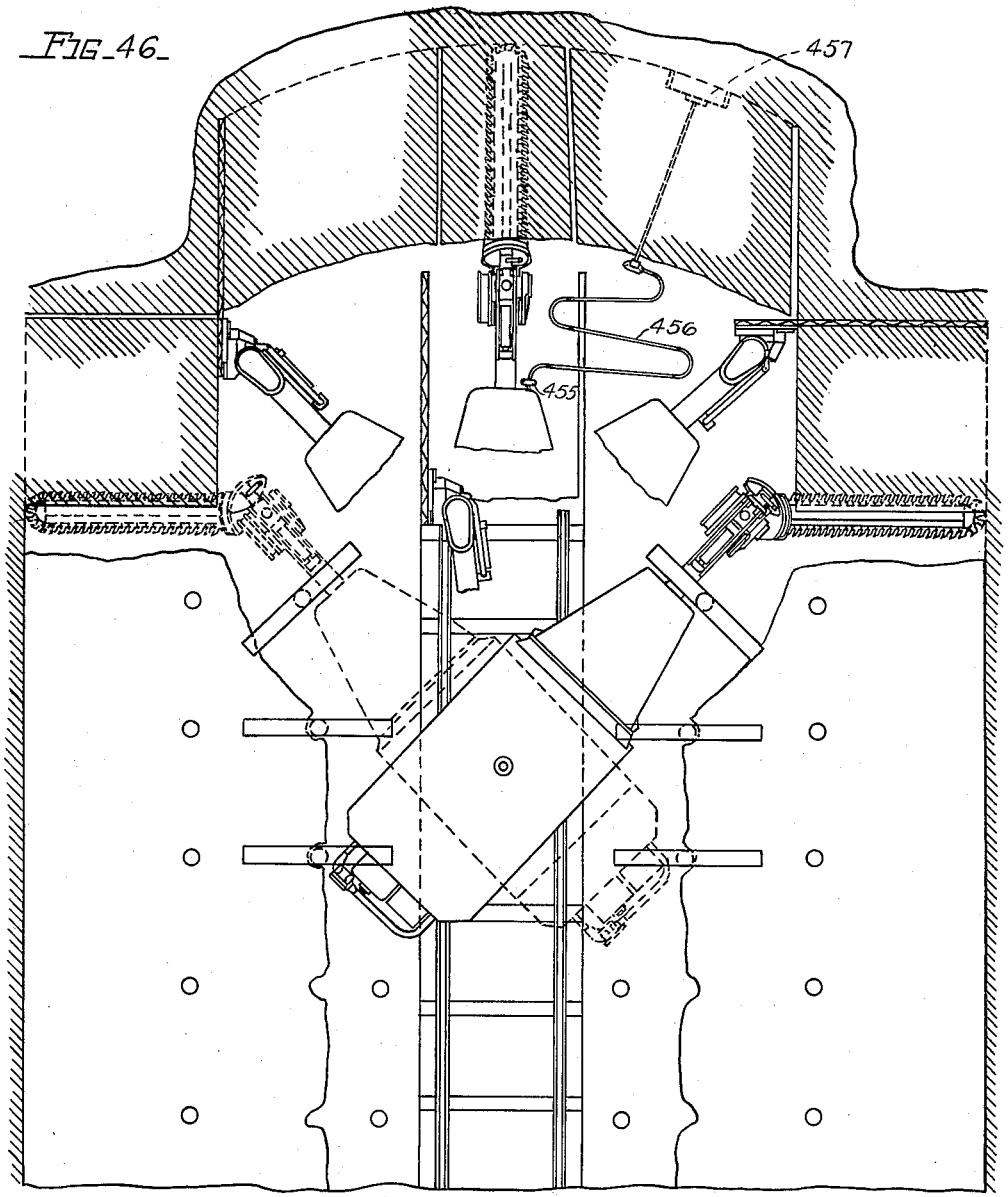
Figure 46 is a plan view of a mine chamber or working place showing one method of mining chambers to which my invention is applicable.

The preferred form of my coal cutting machine consists, in general, of a wheeled truck, a turntable mounted on the truck, and a motor platform extending from one end of the turntable, to the opposite end of which is attached a hollow tubular boom. The turntable is rotated by means of cables attached to hydraulic cylinders, and the boom is likewise raised and lowered by other hydraulic cylinders. On the end of the boom is a cutter head having a kerf cutter with an endless cutter chain, the cutter head itself being tiltable relative to the boom by a hydraulic cylinder. The motor is mounted on the rear platform and drives the truck and also the cutter chain by transmission gearing and shafting. Driven by the motor is a fluid pressure pump supplying fluid under pressure through various conduits and a valve box to the various hydraulic cylinders. Means is also provided for utilizing hydraulic pressure supplied by the pump for breaking down the cut coal. Rising from the turntable on its axis of rotation is a combined hydraulic jack and roof support to engage the roof of the mine chamber.

Truck construction

Referring to the drawings in detail, 1 is a truck base (Figures 4 and 5) supported on truck frame members 2 which in turn rest on supporting plates 3 secured to the axle housings 4. Passing through each axle housing 4 are axles 5 having sprockets 6 secured thereto (Figure 4). The sprockets are drivingly connected by the sprocket chains 7 to the drive sprockets 8 and 9, driven by the cross shaft 10 to which the sprockets 8 and 9 are drivingly secured. Drivingly attached to the axles 5 are flanged wheels 11 adapted to cooperate with rails of the ordinary type used in coal mines.

The truck is propelled, both for transport and for longitudinal feeding, by transmission gearing drivingly connecting an electric motor with the cross shaft 10, this driving connection being described later. Supporting the truck base 1 are brackets 12 secured to the truck frame members 2.

Turntable construction

The gear housing 245 is supported by a flanged plate 13 (Figure 25) which is bolted to an annular ring 14 in a central aperture 15 of the truck base 1. The flanged member 13 has an upwardly extending cylindrical portion 16 which serves as a bearing surface for the annular collar 17 supporting the annular portion 18 of the transmission housing 19 which in turn engages the annular turntable plate 20 abutting the turntable base 21. The annular collar 17 and the annular portion 18 of the transmission housing 19 are held in contacting relationship by the threaded ring 22 screwed on to the cylindrical portion 16 of the flanged member 13 (Figure 25).

Resting upon and secured to the turntable base 21 are the turntable side members 23 (Figure 5), attached to which are the brackets 24 (Figure 3). Through the brackets 24 run the axles 25 supporting the rollers 26, which carry the weight of the turntable and its associated parts. The rollers 26 rest upon and have rolling contact with the annular track 27 supported by the annular plate 28 resting on the truck base 1 (Figure 5). Also secured to the turntable side members 23 are the turntable swinging cylinders 29 and 30, attached thereto at the front by the brackets 31 and at the rear by the brackets 32 (Figure 3).

The turntable swinging cylinders 29 and 30 are shown in detail in Figure 17. The cylinder 29 is closed at its rear end by an end plate 33 attached to the bracket 32 by the bolt 34. The forward end of the cylinder is closed by a threaded end cap 35 through which passes the piston rod 36 carrying the piston rod yoke 37 through which passes the axle 38 of the grooved pulley 39. The piston itself consists of an inside portion 40, a middle portion 41, a packing 42 and an outside portion 43, the whole being held together on a piston rod 36 by the threaded portion 44. The piston rod 36 passes through a bore 45 in the threaded end cap 35 and is separated therefrom by the bushing 46. Over the grooved pulley 39 passes a cable 47 which is anchored at one end 48 to a cross plate 49 secured to the turntable side members 23. The opposite end of the cable passes around the annular plate 28 to an anchorage in the truck base 1.

It will be obvious from Figure 3 that when fluid under pressure is admitted to the forward chamber of the turntable swinging cylinder 29 and withdrawn from the forward chamber of the turntable swinging cylinder 30, the piston rod yoke 37 of the cylinder 29 will be forced backward, while the piston rod yoke 37 of the cylinder 30 is correspondingly forced forward, rotating the turntable in a clockwise direction. If the flow of fluid be reversed, the turntable will swing in a counter-clockwise direction. By thus controlling the direction of the flow of the fluid pressure into the turntable swinging cylinders 29 and 30, the turntable may be swung in either direction as desired. During the swinging, the weight of the turntable will be carried by the rollers 26 which roll around on the annular track 27 supported by the annular plate 28 on the truck base 1 (Figure 5). Attached to the forward end of the turntable is the boom support 51 having a plurality of links 52 (Figure 3).

*Boom construction*

Cooperating with the links 52 on the boom support 51 (Figure 3) are correspondingly shaped link portions 53 forming a part of the boom base 54. The links 52 and the link portions 53 are bored to receive axles 55 which serve as horizontal trunnions for the upward and downward swinging of the boom. Depending from the boom support 51 are cylinder supports 56 (Figure 9), which pivotally engage the wrist pin 57 passing through the bearing 58 on the rearward ends 59 of the boom lifting cylinders 60.

One of the boom lifting cylinders 60 is shown in detail in Figure 18. The forward end is closed by an end cap 61 covering an end plug 62 which supports an internal cylindrical member 63 having side wall perforations 64. Passing through a bore in the plug 62 and end cap 61 is the piston rod 65. Escape of liquid is prevented by the packing 66 held in place by the packing ring 67 in the end plug 62. The piston consists of a lower part 68, a packing 69, a middle part 70, a packing 71 and an upper part 72, all held together on the piston rod 65 by the nut 73 threaded thereon. To the outer end of the piston rod 65 is threaded the piston head 74 having a bore 75 through which passes the wrist pin 76 (Figure 9), also secured in a bored projection 77 on the back boom housing 78 (Figures 6 and 9).

The back boom housing 78 likewise is provided with arms 79 which are bored to receive the cutter head rotating cylinders 80. One of these is shown in detail in Figure 19 and has an end yoke 81 which also serves as an end plug. The end yoke 81 is provided with a fluid port 82 and is also bored to receive the axle 83 supporting the grooved pulley 84. The piston consists of a lower part 85, a middle part 86, a packing 87 and an upper part 88, all held together by a nut 89 threaded on to the end of the piston rod 90. The opposite end of the cylinder 80 is closed by an end cap 91 threaded thereon, and having a bore through which passes the piston rod 90. Threaded to the end of the piston rod 90 is the end yoke 92 bored to receive the axle 93 supporting the grooved pulley 94.

Passing over both grooved pulleys 84 and 94 is a cable 95 anchored at each end to the lower boom housing 78 (Figure 6). In the course of its length, the cable 95 makes several turns around, and at its middle is anchored to the drum 96 which is fixedly secured to the front boom housing 97.

The front boom housing 97 is tubular (Figure 10) and telescopes within the back boom housing 78. The two boom housings 97 and 78 are separated from one another by the bushings 98, and held together by the ring 99 bolted to a flange on the winding drum 96 and engaging a corresponding flange 100 on the back boom housing 78 so that the one housing may rotate within the other. The latch 101 (Figure 10) engages correspondingly peripherally arranged slots in the winding drum 96 and may be engaged or disengaged therefrom by working the hand lever 102 (Figure 6), pivotally attached to the connecting rod 103 which in turn is pivoted to the latch 101.

It will be obvious that by admitting fluid under pressure in the lower ends of the boom lifting cylinders 60, the pistons thereof will be forced outward therefrom, causing the boom to swing upward. It will also be seen that when pressure fluid is admitted to the forward chamber of one of the cutter head rotating cylinders 80 and withdrawn from the forward chamber of the opposite cylinder, the cable 95 will be pulled in one direction and paid out in the other, thus rotating the winding drum 96 and with it the cutter head. Before rotating the winding drum 96, the latch 101 is disengaged therefrom by operating the hand lever 102, and re-engaged when the rotation of the winding drum ceases, thus locking the upper boom housing 97 in its rotated position.

Secured to a base plate 104 on the front boom housing 97 is the cutter head tilting or deflecting cylinder 105 (Figures 6, 8 and 9). The cutter head tilting or deflecting cylinder 105 has an end cap 106 on one end, and an end plug 107 closing the other end. Through a bore in the end plug 107 passes the piston rod 108 having secured to it the cross head 109 pivotally engaging the connecting rods 110 at the bored portions 111 thereof.

The opposite ends of the connecting rods 110 have bores 112 which engage link portions 113 projecting from the cutter head housing 114 (Figure 14). Each of the connecting rods 110 fits between a pair of link portions 113, and is pivotally joined therewith by axles 115 passing therethrough.

To provide for tilting or deflecting, the cutter head housing 114 (Figure 30) bears a cylindrical portion 116 and a cylindrical bore 117a cooperating respectively with a corresponding cylindrical bore 117 in the projecting arm 118 of the upper boom housing 97, and a cylindrical portion 116a in the projecting arm 119 thereof, these being separated from each other by the bushings 120. Accordingly, when fluid under pressure is admitted to the chamber adjacent to the end cap 106 of the cutter head tilting or deflecting cylinder 105, the piston rod 108 thereof will be forced outward, carrying with it the cross head 109 and the connecting rods 110, together with the link portions 113 attached to the cutter head housing: under these conditions the cutter head will be tilted upward or deflected outward. By reversing the flow of the fluid and causing it to enter near the end plug 107 of the cutter head tilting or deflecting cylinder 105, the piston rod 108 will be pulled inward, causing the cutter head to be tilted downward or inward through the action of the connecting rods 110. The axis for the tilting or deflecting of the cutter head is thus the axis of the cutter head cylindrical portion 116 crosswise of the boom, and hence is likewise the axis of the boom housing cylindrical bore 117. In order to guide the cutter head during its tilting or deflecting movement, as well as to retain the parts in place, the cutter head housing 114 is provided with an arcuate retaining plate 161 held in place by the bolt 162 and making contact with a flanged portion 163 (Figure 30) on the projecting arm 119 of the upper boom housing 97. The opposite side of the flanged portion 163 rests against a thrust ring 164.

In addition to this tilting or sidewise deflecting of the cutter head around a crosswise axis, the cutter blade itself may be swung around the axis of its mounting (Figures 31 and 32). The cutter head housing 114 on its lower part has a cylindrical portion 121 surrounded by bushings 122 separating it from a cylindrical bore 123 at the rearward end of the cutter blade support 124, the whole being held in place by the annular plate 125 bolted to the bottom of the cylindrical portion 121. By this provision the cutter blade support 124 may be swung from side to side or up and down around the axis of the cutter blade bore 123. The cutter head housing 114 in its forward lower part bears an arcuate flange 126 which serves as a guide for the swinging of the cutter blade support 124, the latter being provided with an arcuate retaining plate 127 overlapping the flange 126 and bolted to the cutter blade support 124 (Figure 31).

The swinging of the cutter blade support 124 is controlled, and the cutter blade support 124 is locked in place at any desired position, by the use of a brake lining 128 secured to a brake band 129 (Figure 32) and making contact with the outer surface 130 of the cylindrical portion 131 of the cutter blade support 124, the outer surface 130 and the inner surface 123 thereof being coaxial cylinders. One end of the brake band 129 is anchored to the cutter head housing 114, as by the bolts 132, whereas the other end is secured, as at 133, to the tension rod 134 having its opposite end 135 threaded to receive the adjusting nut 136. The tension rod 134 passes through a hole 137 in the brake lever 138 having a fulcrum projection 139 which bears against the brake band 129 resting against the cutter head housing 114. The opposite end of the brake lever 138 is bored at 140 to receive a brake rod 141 threaded at its outer end 142 to receive an adjusting nut 143, and provided at its inner end with a ring-shaped portion 144 which is engaged by the crank 145 on the end of the brake control shaft 146. The brake control shaft 146 is journaled in the cutter head housing 114 and rotatably mounted in the bushings 147 therein, held in place by the retaining collar 148 and squared at its upper end 149 to receive the correspondingly squared portion of a hand lever or crank.

When it is desired to swing the cutter blade support 124, the brake lining 128 is released from its gripping action on the cylindrical portion 130 by turning the brake shaft control 146 with the hand crank or hand lever previously mentioned: this turns the crank 145 which causes the brake rod 141 to move, allowing the brake lever 138 to rock on its fulcrum 139 relieving the tension of the tension rod 134 on the brake band 129.

The cutter blade support 124 is provided with a cutter blade or bar 124a having a peripheral groove 150 (Figure 15) in which runs an endless cutter chain 151 composed of individual links 152 with a single tooth 153, each link being joined with its neighbors at front and rear by the pins 154 passing therethrough. The interstices 155 between alternate links are engaged by the teeth 156 (Figure 16) of a two-part sprocket 157. When the sprocket 157 is rotated by the mechanism about to be described, the cutter chain 151 will pursue an orbital path around the cutter bar 124a in the groove 150 thereof. The cutter blade 124a bears a slidable center portion 158 which may be adjusted relative to the cutter blade support 124 by turning the adjusting bolt 159 and locking it in position with the lock nuts 160: in this manner any slackness in the cutter chain 151 may be quickly and easily taken up.

*Truck driving and feeding mechanism*

The truck which carries the turntable supporting the main parts of the machine has already been described. Its propulsion mechanism will now be given in detail.

The turntable base 21 (Figure 1) is provided at its rear end with a downwardly depended motor platform 165 having mounted thereon an electric motor 166 and an automatic starter 167 contained in a starter box 168. The motor and starter may be of a standard commercial type, as is well known in the art. A push button switch may be located at any desired point on the frame and the wires therefrom connected to the automatic starter 167 by a conduit. As an alternative, the switch itself may be contained in the automatic starter box 168 (Figure 3) and controlled by means of hand lever actuating rods leading to the switch through the walls of the automatic starter box 168. The latter form of switch is preferable since the automatic starter box 168 may be made gas-tight and sparking at the switch points will not create any danger of igniting inflammable mine gases.

The shaft 167a of the motor 166 is connected by a coupling 168a to the main drive shaft 169 (Figure 3) entering the truck transmission housing 170, where it is journaled in anti-friction bearings 171 located at its entrance and exit points, and also in the middle of the housing 170 (Figure 20).

The speed reversing transmission occupies the rearward end of the truck transmission housing 170. Drivingly secured to the main drive shaft 169 is the pinion 172 which meshes with and drives the gear 173 of the reversing transmission now to be described. Drivingly connected to the gear 173 are the outer plates of a multiple disk clutch 174, the inner plates of which are drivingly connected wih the reverse countershaft 175. The gear 173 itself is supported on anti-friction bearings 176 (Figure 21) separating it from the reverse countershaft 175 so as to rotate freely thereon. As this clutch 174 is identical in construction with the multiple disk clutch 177 on the same shaft 175 (Figure 20), a detailed description of the former will suffice for both. The plates of the multiple disk clutch 174 are brought into engagement with one another through the agency of the clutch spider 178 against the action of springs 179 on the contact fingers 180: the clutch spider 178 ends in a shell-like portion 181 resting on a bushing 182 which in turn is slidable to and fro on the bushing 183 surrounding the reverse countershaft 175. Also surrounding the bushing 183 is an anti-friction bearing 184, to the outer race of which is secured the clutch shifter arm 185 movable to and fro under the guidance of the cap screw 186 working in a slot 187 in the arm 185 and communicates by a shaft 190 to a hand reverse lever 191 fixed thereto. Also situated on and surrounding the bushing 183 is a bushing 192 (Figure 21) which in turn is surrounded by the shell portion 193 of the clutch spider 194 which actuates the multiple disk clutch 177 through the agency of the clutch fingers 195 working against the action of the springs 196. It will be obvious that by moving the hand reverse lever 191 sidewise (Figure 20), the clutch spiders 178 and 194 will move to and fro along the shaft 175, alternately engaging the plates of either of the multiple disk clutches 174 or 177, causing the portions attached thereto to become drivingly inter-connected in the manner set forth below.

Also drivingly secured to the main drive shaft 169 is a second pinion 197 (Figure 20) which meshes with and drives an idler pinion 198 (Figure 23) keyed to the idler shaft 199 (Figure 24) which rotates in anti-friction bearings 200 mounted in the bracket 201 secured to the truck transmission housing 170, as by the bolts 202. The idler pinion 198 meshes with the gear 203 (Figure 23) which is drivingly secured to the outer rotor 204 of the multiple disk clutch 177 (Figure 21). The outer rotor 204 rotates freely on anti-friction bearings 205 separating it from the reverse countershaft 175, and drives the outer rotor plates 206 of the multiple disk clutch 177, the inner plates 207 being drivingly connected to the inner rotor 208 of the multiple disk clutch 177, the inner rotor 208 being drivingly secured, as by a key, to the reverse countershaft 175.

To operate the foregoing reverse gearing, the hand reverse lever 191 is moved sidewise, also moving the clutch spiders 194 and 178 to and fro along the reverse countershaft 175. If the clutch spider 178 be moved to the right so as to engage the plates of the multiple disk clutch 174 (Figure 21), the outer rotor of the clutch 174 becomes drivingly connected with the reverse countershaft 175 and the pinion 172 will drive the gear 173 and the reverse countershaft 175 in the opposite direction from the direction of rotation of the main drive shaft 169 (Figure 22). If, on the other hand, the clutch spider 194 is moved to the left, engaging the plates of the multiple disk clutch 177, the outer rotor 204 thereof becomes drivingly connected with the reverse countershaft 175, and the pinion 197 on the main drive shaft 169 drives the idler pinion 198 which in turn drives the gear 203 and the reverse countershaft 175 in the same direction as the direction of rotation of the main drive shaft 169 (Figure 23).

In this manner the direction of rotation of the reverse countershaft 175 may be reversed at will, merely by moving the hand reverse lever 191 to the right or to the left and this, as we shall see later, causes the truck to be propelled forward or backward. When the hand reverse lever 191 is in the neutral position shown in Figure 3, and the clutch shifter arm 185 is accordingly in the position shown in Figures 20 and 21, neither of the clutches 174 or 177 will be actuated, and the outer rotors thereof will rotate in opposite directions freely around the inner rotors, the reverse countershaft 175 remaining motionless.

The change-speed gearing occupies the center portion of the truck transmission housing 170 (Figure 20). Keyed to the reverse countershaft 175 is the pinion 209. Beyond the pinion 209, the reverse countershaft 175 (Figure 21) is tapered and enters the hub 215 of a gear 216 to which it is drivingly secured as by the key 217. Surrounding the hub 215 is an anti-friction bearing 218 mounted in a projection 219 of the truck transmission housing 170. The bearing 218 is held in place by the collar 220 pinned to the hub 215. In a recess 221 in the gear 216 is mounted an anti-friction bearing 222 which supports an independently rotatable shaft, the purpose of which will presently appear.

The pinion 209 meshes with and drives the gear 210 drivingly secured to the change-speed countershaft 211 which in turn rotates in anti-friction bearings 212 mounted in the bracket 213 attached to the truck transmission housing 170, as by the bolts 214.

Drivingly secured to the opposite end of the change-speed countershaft 211 (Figure 20) is the pinion 223 which meshes with and drives the two-part sliding gear 224.

The sliding gear 224 consists of an external gear portion and an internal gear portion connected by the bridge portion 225. The gear 224 slides to and fro on the change-speed shaft 228 (Figure 21), yet remains drivingly connected therewith through the agency of the feather key 228a. This sliding is accomplished by a shifter rod 226 (Figure 26) which engages the bridge portion 225 in the sliding gear 224. The shifter rod 226 is slid to and fro in the guides 226a bolted to the truck transmission housing cover plate 170a through the agency of the hand lever 229 on the shaft 227 (Figure 3). In its forward position, as shown in Figures 20 and 21, the external portion of the sliding gear 224 meshes with the pinion 223 and is driven by it, so that the change-speed shaft 228 is driven at a low speed from the pinion 209 through the back gearing 210 and 223. When the sliding gear 224 is slid to the right, as shown by the dotted lines in Figure 20, its external gear portion becomes disengaged from the pinion 223 and its internal gear portion slides over and intermeshes with the gear 216 keyed to the reverse countershaft 175; in that position the two gears 216 and 224 perform a clutching action to establish a direct driving connection between the change-speed shaft 228 and the reverse countershaft 175, whereupon a high speed is imparted to the change-speed shaft 228.

Drivingly secured to the change-speed shaft 228 is a bevel pinion 230 whose hub rotates in an anti-friction bearing 231 mounted in a partition 232 of the truck transmission housing 170 (Figure 21). The bevel pinion 230 meshes with and drives the bevel gear 233 drivingly secured to the vertical shaft 234 whose axis coincides with the axis of rotation of the turntable base 21. The vertical shaft 234 is rotatably supported in anti-friction bearings 235 and 236 mounted in the cylindrical portion 16 of the flanged plate 13 secured to the truck base 1. Drivingly secured to the lower end of the vertical shaft 234 is a bevel pinion 237 which meshes with and drives the bevel gear 238, drivingly secured to the cross shaft 10, which in turn drivingly engages the sprockets 8 and 9 on each end thereof. The hub of the sprocket 8 is rotatably mounted in an anti-friction bearing 239 held in place by the annular plate 241 bolted to the gear case 240 which is secured to the flanged plate 13. Within the annular plate 241 is a packing 242 to prevent the escape of lubricant. The hub of the bevel gear 238 is rotatably mounted in an anti-friction bearing 243 held by the end plate 244 of the gear box 240 (Figure 25). The hub of the sprocket 9 is likewise protected from the escape of lubricant by the packing 245.

As has been previously described, the sprockets 8 and 9 are drivingly connected to the sprockets 6 on the axles 5 of the truck by means of the sprocket chains 7, and on the ends of the axles 5 are mounted the flanged wheels 11 which engage the track resting on the mine floor.

Thus by the truck transmission mechanism just described, the coal cutting machine can be moved backward or forward at either of two different speeds, or remain at rest locked in a neutral position. Movement of the machine on grades may be controlled by a brake mechanism (Figure 25) about to be described. Meshing with and driven from the bevel gear 233 is a bevel pinion 246 drivingly secured on the brake countershaft 247, to the opposite end of which is secured to the brake drum 248. The brake countershaft 247 is rotatably mounted in anti-friction bearings encircling the hubs of the bevel pinion 246 and the brake drum 248, these anti-friction bearings being mounted in the truck transmission housing 170 and held in place by the annular retainer plate 249 bolted thereto. Engaging the brake drum 248 is a brake lining 250 supported by a brake band 251 (Figure 27) anchored at its upper portion by the lugs 252 engaging the anchor stud 253. At its lower portion the brake band 251 is provided with lugs 254 connected by the tension spring 255. Between the lugs 254 is mounted a brake cam 256 integral with the brake shaft 257 (Figure 25) which passes outwardly through a cylindrical projection 258 on the brake cover plate 259. The end of the cylindrical projection 256 is threaded and carries a packing 260 held in place and adjusted by the cap 261. Rigidly secured to the outer end of the brake rod 257 is the brake lever 262 which, when moved sidewise, turns the brake cam 256 and forces apart the lugs 254 on the brake band 251, thereby causing application of the brake. The brake lever 262 may thus be used merely to slow down the forward or rearward motion of the truck, or to lock the truck against either rearward or forward motion.

For the purpose of affording the machine rigidity during the slot-forming operations, it is locked in place by a hydraulic anchor jack mounted on the upper surface of the truck transmission housing 170 (Figures 1 and 25). This anchor jack consists of a cylinder portion 263 bolted to the truck transmission housing 170. The cylinder portion 263 is provided with a fluid duct 264 to which is connected a fluid conduit 265. The upper end of the cylinder is closed by an annular plate 266 secured to the cylinder 263 as by bolts. Through this annular plate 266 passes the piston 267 having a packing 268 held in place by a washer 269 secured to the piston 267 by the nut 270 engaging the stud bolt 271. The piston 267 has a tubular piston rod 272 secured thereto and rising therefrom, this being surrounded by a piston rod extension 273 (Figure 1) terminating at its upper end in a jack head cap 274. It will be seen that when fluid under pressure passes through the fluid conduit 265 and the fluid duct 264 into the lower end of the cylinder 263, the piston 267 will be forced upward, carrying with it the piston rod 272 and the piston rod extension 273 facing the cap 274 thereof firmly against the roof of the mine chamber (Figure 1).

The use of the hydraulic anchor jack as just described not only provides a means of locking the machine firmly in position during the slot-forming operations but further serves the useful purpose of supporting the overlying mine roof in the vicinity of the machine, thus affording protection to the machine and greater safety for the machine operators.

The piston rod extension 273 telescopes around the piston rod 272. The latter is provided with a series of holes 275 at varying heights. The piston rod extension 273 rests upon a pin 276 which may be inserted through the holes 275 to bring the cap 274 as near as possible to the mine roof before operating the piston 267.

*Cutter chain driving mechanism*

The cutter chain driving mechanism starts at the main shaft 169 coupled to the motor shaft 167a (Figure 3). The main drive shaft 169 passes through the truck transmission housing 170 (Figure 20) as previously observed, and is drivingly joined to the main shaft extension 278 (Figure 29) by the coupling 277. The main shaft extension 278 is journaled in anti-friction bearings 279 mounted in the cylinder support 56. The bearings 279 are held in position by the end plate 280 bolted to the cylinder support 56. In the end plate 280 is a packing 281 to prevent the escape of lubricant. The other end of the main shaft extension 278 is covered by an end plate 282. Drivingly secured on the main shaft extension 278 is a gear 283 which meshes with and drives the sliding gear 284 which drivingly engages splines 285 on the main countershaft 286. The hub 287 of the gear 284 is provided with an annular slot which receives a shift yoke 288 mounted on the shift rod 289 which passes through the journal 290 in the end wall of the cylinder support 56, emerging therefrom to be connected to a shift lever 291 by the pin 292 in the slot 293 (Figures 3 and 29). The inner end of the shift lever 291 is pivotally secured by the pin 294 to the boss 295 projecting from the inner wall of the cylinder support 56 (Figure 3). The shift rod 289 is guided and the escape of liquid prevented by a packing adjusted by the nut 296.

When the shift lever 291 is moved to the right (Figure 3), the shift rod 289 (Figure 29) is drawn outward, sliding the gear 284 along the main countershaft 286 and disengaging the former from the gear 283. In this way all of the mechanism beyond the gear 283 may be disconnected from the main drive shaft 169, and the cutter chain 151 brought completely to rest at any time.

The main countershaft 286 is journaled at each end in anti-friction bearings 297 mounted in the walls of the cylinder support 56 (Figure 29). At its outer end the main countershaft 286 carries the yoke 298 of a universal joint 299, the other yoke 300 being slidably and drivingly engaged with the spline shaft 301. The spline shaft 301 passes through the collar 302 which is journaled in anti-friction bearings 303 held in the boom base 54 by the annular plate 304, the latter containing a packing 305 to prevent the escape of lubricant (Figure 10). The spline shaft 301 proceeds inside the back boom housing 78 through an anti-friction bearing 306 held in the end plate 307 of the front boom housing 97 by the annular end plate 308. Within the back boom housing 78, the splined shaft 301 is surrounded by the tube 309 attached to the annular end plate 308, whereas within the front boom housing 97 it is surrounded by the tube 310 secured to the end plate 307. Through both of the boom housings 78 and 97 pass fluid conduits 311 and 312 which connect the cutter head tilting or deflecting cylinder 105 with the fluid pressure valve box and pump described later. The universal joint 299 (Figure 29) is surrounded by the universal joint housing 313 which is of hollow spherical shape and which pivots in the cylinder support 56. Escape of lubricant is prevented by the wiper 314. The top of the cylinder support 56 is closed by the cover plate 315. The spline shaft 301 terminates at the end of the boom (Figure 11) where it is journaled in an anti-friction bearing 316 mounted in the front boom housing 97. On the upper end of the spline shaft 301 is drivingly secured the bevel pinion 317 which meshes with and drives the bevel pinion 318 (Figure 30) drivingly secured to the boom head countershaft 319. Drivingly secured to the opposite end of the boom countershaft 319 is a pinion 320 which meshes with an idler 321 revolving freely around the anti-friction bearings 322 and 323 surrounding the stub shaft 324 whose threaded end 325 is screwed into a threaded recess 326 in the front boom arm 119. The boom countershaft 319 is journaled in anti-friction bearings 327 and 328 surrounding the hubs of the pinions 318 and 320 and mounted in the front boom arm 119. The idler gear 321 meshes with and drives the gear 329 drivingly secured to the cutter head countershaft 330. Access to the gears and pinions 320, 321 and 329 is obtained by removing the cover plate 331 bolted to the side walls of the front boom arm 119.

The cutter head countershaft 330 is journaled in anti-friction bearings 332 and 333 mounted in the front boom arm 119.

The cutter head countershaft 330 terminates in a bevel pinion 334 integral therewith. The bevel pinion 334 meshes with and drives the bevel gear 335, (Figures 30 and 31) which is drivingly secured to the cutter chain drive sprocket shaft 336 which is journaled in anti-friction bearings 337 surrounding the hub of the gear 335, and 338 surrounding the sprocket shaft 336 itself. The bearings 337 and 338 are mounted in the cutter head housing 114. At its opposite end, the sprocket shaft 336 bears an enlarged portion 339 to which is secured the double sprocket 157, as by the tie rivets 340. The teeth 156 of the double sprocket 157 engage the interstices 155 between the links 152 of the endless cutter chain in the manner previously set forth.

Thus it will be seen that when the motor 166 is started, power is transmitted through the main drive shaft 169 (Figure 20) through the main shaft extension 278 coupled thereto (Figure 29), by way of the main countershaft 286 (assuming the gear 284 to be in mesh with the gear 283), thence through the universal joint 299 by way of the spline shaft 301 to the bevel pinion 317 (Figure 30) where it proceeds through the cutter head gearing just described to the double sprocket 157 and causes the endless cutter chain 151 to pursue an orbital path around the groove 150 in the cutter blade 124a.

*Fluid pressure system, pump and valves*

Fluid pressure for the operation of the various hydraulic cylinders previously mentioned and the hydraulic breaker pad (Figure 41) is supplied by means of a fluid pressure pump contained in the main fluid tank 341 situated on the forward portion of the turntable base 21 (Figure 3). If no breaker pad be provided with the machine a simpler pump system, as illustrated in Figs. 33 and 34, may be used. A more complex system, later described, is used when a higher pressure is to be supplied to a breaker pad. Details of that system are shown in Figs. 35 to 40, inclusive, as well as in Fig. 3. The pump is driven from the main drive shaft 169 by a sprocket 342 which engages a sprocket chain 343 passing around a sprocket 344 drivingly mounted on the end of the pump drive shaft 345, as shown in Figures 33 and 36. The pump of the more complex, preferred, system, shown in Figure 36, is similar to that in Figure 33, but has its shafts arranged in a vertical plane, and is additionally provided with a casing 400 containing a pair of reversing valves 403 and 404, as will presently appear. The tank 341 in Figure 3 is accordingly of a slightly different shape from that shown in Figures 33 and 34, but is otherwise substantially the same.

The simpler system may be described first. The pump drive shaft 345 (Figure 33) is journaled in anti-friction bearings 346 and 347 mounted in the extension 348 of the main tank 341. The fluid pressure pump itself is contained in a four-part casing 349, 350, 351 and 352, held together by the stud bolts 353. The pump is of the gear type, having a gear 354 drivingly secured to the pump drive shaft 345 and meshing with a corresponding gear 355 drivingly secured to the pump countershaft 356. The pump drive shaft within the pump and the pump countershaft are journaled in anti-friction bearings 357, 358, 359 and 360. Leading into the pump is the pump intake port 361 to which is attached the intake conduit 362 (Figure 34).

Leading upwardly from the outlet port 363 of the pump is the outlet conduit 364 which passes through a T connection 365. Downwardly extending from the T connection 365 is a safety relief valve 366 which may be set to discharge the fluid back into the tank at any predetermined pressure. This relief valve 366 may be optionally placed outside the fluid tank 341 if desired, as shown in Figure 3. The outlet passage 367 continues onward from the T connection 365 and proceeds onward to the main distributing valve box 368. From the distributing valve box 368, a return conduit 370 carries fluid back to the tank 341 (Figure 3) and discharges it into the auxiliary fluid tank 371 (Figures 33 and 34). Here the fluid flows through the strainer 372 into the main tank 341 and thus completes the hydraulic circuit.

Now referring to the more complex, preferred, system utilizing a breaker pad when needed, it will be seen that attached to the pump body (Figure 36) is a valve casing 400 having two vertical valve bores 401 and 402 formed therein and arranged to receive the main reversing valve 403 (Figure 37) and breaker pad reversing valve 404 (Figure 38). These valves are provided with actuating handles 405 and 406 respectively.

An interlocking arrangement is provided for the handles 405 and 406 to prevent both valves being used simultaneously and yet to permit the operation of either valve at any time independently of the other. This is accomplished by cutting away portions 407 and 408 of the circular form of the hubs 409 and 410 of the handles 405 and 406 respectively (Figure 35). The main and breaker pad reversing valves 403 and 404 are provided respectively with upper annular channels 411 and 412, lower annular channels 413 and 414, upper longitudinal passages 415 and 416, and lower longitudinal passages 417 and 418. The upper and lower longitudinal passages on each valve are at diametrically opposite sides of their respective valve from each other. The valve casing 400 is provided with longitudinal pump intake and pump discharge conduits 419 and 420 arranged midway between upper transverse passages 421 and 422, and lower transverse passages 423 and 424. Passage 421 connects with the lower portion of the tank 341. Passage 422 connects with the lower portion of an auxiliary tank 432, later described. The passages 423 and 424 make a right angle bend and proceed upward to emerge at the top surface of the valve casing 400. Passage 423 has connected to it the pipe 367 leading to the valve box 368 and also connects through pipe 265 to the anchor jack. Passage 424 leads to the breaker pad line 324. The valve bores 401 and 402 are closed at their lower ends by the screw plugs 425 and 426 and at their upper ends by the screw collars 427 and 428 arranged to compress the packings 429 and 430 respectively. From Figure 37 it will be noticed that when the valve handle 405 is rotated so as to cause the upper passage 415 of the main valve 403 to coincide with the pump intake passage 419 and the bottom passage 417 to coincide with the pump discharge passage 420, the oil is caused to flow from the main tank 341 through the pump and out to the main distributing valve box 368. When the main valve handle 405 is rotated to the opposite position the pump withdraws the liquid from what was previously its discharge line and discharges it back into the main tank 341. The only occasion to be thus manipulated is to withdraw the anchor jack cap 274 from contact with the mine roof.

The operation of the breaker pad reversing valve 404 (Figure 38) is the same as that of the main reversing valve 403. Its reversing feature is provided to permit the breaker pad (Figure 41) to be both expanded and collapsed as the working conditions may demand, from its own fluid tank 432 by way of the pipe (Figure 3).

Figure 3 shows the general arrangement of the hydraulic system of piping, pump, reversing valves 403 and 404, fluid tanks 341 and 432 and main distributing valve box 368. The latter is described in detail in my copending application Serial No. 684,707 now matured into Patent No. 2,062,657, granted December 1, 1936. The individual valves in the valve box 368 are similar in construction to the valves 403 and 404 just described and are actuated by the handles 373 to control both the quantity and direction of the pressure fluid passing between the pump and the various hydraulic cylinders. The latter may thus be reversibly operated at various speeds to carry out the various movements of the machine.

The main distributing valve box 368 has four valves 441, 444, 447 and 450. The conduits 439 and 440 run to the ends of the turntable swing cylinders 29 and 30, and are controlled by the valve 441. Similarly, the conduits 442 and 443 run respectively to the opposite ends of the boom lifting cylinders 60 and are controlled by the valve 444; the conduits 445 and 446 run to the opposite ends of the cutter head tilting cylinder 105 and are controlled by the valve 447; and the conduits 448 and 449 run to the forward ends of the cutter head rotating cylinders 80 and are controlled by the valve 450. The turntable swing cylinders are also provided with conduits 451 and 452 leading from the ends opposite the conduits 439 and 440.

As previously partially explained, an additional conduit 374 runs from the breaker pad reversing valve 404 to (Figures 2 and 46) a connection 455 for the flexible hose 456 of the hydraulic breaker pad 457 (Figure 41). The conduit 374 also contains the breaker pad relief valve 369. The conduit 367 running from the pump to the valve box 368 (Figure 3) also has a branch line 265 leading to the anchor jack cylinder 263 and controlled by the globe valve 458, as also previously partially explained.

The hydraulic breaker pad 457 (Figures 41 to 45) consists of an envelope 458 of flexible and expansible material, such as rubber, with its open ends closed by the straps 459 clamped together by the bolts 460. The envelope 458 is reinforced by the strengthening strips 461.

The straps 459 at one end of the envelope 458 are provided with an extension 462 which receives the rigid breaker pad handling pipe 463 and holds it by the clamping bolt 463a (Figure 41). One end of the handling pipe 463 is threadedly connected to a junction 464 which is joined to the envelope 458 by the bolts 465 clamping the junction base 466 to the internal member 467. The opposite end of the handling pipe 463 is provided with a hand ring 468 having a hub 469 with a hollow boss 470 forming a junction for the attachment of the flexible breaker pad conduit 456, as by the connection 471.

*Operation summarized*

The operation of the individual parts of the machine has been described in detail during the description of those parts. It will now be sufficient to describe the operation of the machine as a whole and its use in mining. Being of the track-mounted type, the machine is provided with flanged wheels which cooperate with tracks or rails laid on the floor of the mine galleries.

To mine or continue the mining of a mine gallery or entry in its forward direction by the slot-forming method (Figures 1 and 49), the machine is advanced upon its tracks by operating the electric motor 166, which transmits power through the transmission gearing and sprockets previously described to the sprockets 6 on the axles 5 of the truck, causing the truck to move forward or backward at high or low speed, depending upon the positions of the reversing elements and speed-change elements in the transmission gearing previously described. The truck is advanced on the tracks until the cutter blade is adjacent to the end wall of the gallery.

To cut the bottom slot in the end wall of the mine gallery, the cutter blade is dropped to a position approximately coincident with the mine floor, by admitting pressure fluid to the forward chambers of the boom raising cylinders 60 (Figure 1), thereby tilting the boom downward: at the same time, pressure fluid is admitted to the rearward end of the cutter head tilting or deflecting cylinder 105, thereby retaining the level of the cutter blade in a position horizontal with the mine floor while the boom is being lowered. The cutter blade now rests approximately on the mine floor with its plane in a horizontal plane. The machine is now swung on its turntable until the tip of the cutter blade is in the corner between the side wall and the end wall of the mine gallery.

To make the sumping cut, the power transmission devices of the truck are now set in operation, causing the machine to advance on its rails in a longitudinal direction: meanwhile the cutter chain is traveling in an orbital path, cutting its way into the end wall of the mine gallery in the lower corner thereof. When the usable part of the cutter blade is buried its full length in the mine wall (Figures 1 and 49), the forward operation of the machine is halted.

A sumping cut may be made in the side wall by manipulating the turntable swinging cylinders and the head tilting cylinder simultaneously, as shown in the upper right-hand corner of Figure 46. In this way the cutter blade is maintained perpendicular to the working face while the turntable is swung to force it to cut its way inward.

Figure 50:
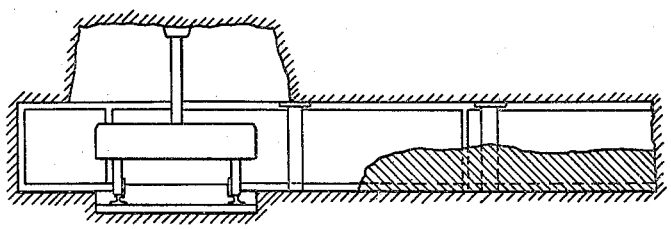
Figure 50 is a vertical section through the mine entry shown in Figure 49.

To complete the bottom slot, the machine is now pivotally anchored by hydraulically raising the anchor jack extension 273 until its cap 274 is thrust against the mine roof. By admitting pressure fluid into the hydraulic cylinders 29 and 30, the turntable base 21 is swung sidewise through an angular path, carrying with it the cutting machine mechanism which it supports: the cutter chain during this operation cuts a fan-shaped slot deep in the end of the mine wall (Figure 50). When the sidewise swinging of the turntable has been completed, so that the tip of the cutter blade now has reached the position which the gallery wall will have when extended, the rotation of the turntable is halted and the anchor jack cap 274 withdrawn from the mine gallery roof. The reversing mechanism of the truck is now placed in operation, and the machine travels backward in a straight line, causing the tip of the cutter blade to trace a path coincident with the proposed extension of the mine gallery side wall, and thus completing the bottom cutter slot. The backward motion of the truck is halted when the tip of the cutter blade emerges again into the mine gallery, completing the bottom horizontal slot.

To make the top slot in the end of the mine gallery parallel to the bottom slot, the cutter head is now inverted by admitting pressure fluid into the cutter head rotating cylinders 80, causing them to pull the cable 95 and rotate the drum 96 around which the cable passes, thereby rotating the front boom housing 97 and the cutter head and cutter blade connected to it. The cutter head now occupies the inverted position shown by the dotted lines in Figure 1, but with the cutter blade extending forwardly. By admitting pressure fluid to the rearward ends of the boom lifting cylinders 60, and simultaneously admitting pressure fluid to the cutter head tilting or deflecting cylinder 105, the boom is raised and at the same time the cutter blade 124 maintained parallel to the mine floor. The cutter blade comes to rest in a position adjacent to the mine roof and approximately parallel to the mine floor. The boom is now swung sidewise exactly as in making the bottom slot, until the tip of the cutter blade rests in the upper corner between the ceiling, the end wall and the side wall. The sumping cut is now made as before by advancing the truck, causing the tip of the cutter blade to cut its way into the mine end wall until all of its usable length has penetrated the coal seam. The truck is now halted and the anchor jack extension 273 raised hydraulically until the cap 274 again is thrust against the mine gallery ceiling. The sidewise slot is now completed by admitting pressure fluid into the turntable swinging cylinders 29 and 30, causing the cutter blade to execute an angular slot exactly similar and parallel to the corresponding bottom slot, pivoting around the anchor jack cap 274 thrust against the mine ceiling. When the fan-shaped top slot has been completed and the tip of the cutter blade coincides with the proposed extension of the mine gallery side wall, the anchor jack cap 274 is withdrawn from contact with the roof and the truck caused to move backward, withdrawing the cutter blade from the coal seam and completing the top slot.

It is obvious that by a repetition of the operations as just described slots may be cut in a horizontal or angular plane at any point intermediate of the coal seam between the roof and floor thereof. This makes possible the cutting out of stratified bands of dirt or impurities that may exist in the coal seam and the definite separation of such dirt or impurities from the coal during the mining process.

To make the shearing or vertical slots, pressure fluid is admitted to the cutter head rotating cylinders 80, causing them to rotate the front boom housing 97 through a quarter turn until the plane of the cutter blade is vertical. The turntable is then swung sideways by admitting pressure fluid to the turntable swinging cylinders 29 and 30, and simultaneously to the cutter head tilting or deflecting cylinder 105 until the bottom of the cutter blade rests against the side wall of the mine gallery. The boom is then raised until the cutter blade tip rests in one of the upper corners between the end wall, side wall and ceiling.

The sumping cut is now performed as before by advancing the machine along its tracks, the cutter chain cutting its way into the end wall in a vertical sump. When the cutter blade is buried in the mine wall throughout its usable length, the machine is halted and again anchored by hydraulically thrusting the anchor jack cap 274 against the mine ceiling. The turntable remains inoperative, while pressure fluid is admitted to the forward end of the boom raising cylinders 60, causing the boom to move downward and making the cutter blade cut a fan-shaped vertical slot. When the tip of the cutter blade reaches the proposed extension of the floor level, the boom swinging is halted, the anchor jack cap 274 withdrawn from the roof, and the truck caused to move backward, withdrawing the cutter blade from the mine wall and completing the vertical slot.

Figure 48:
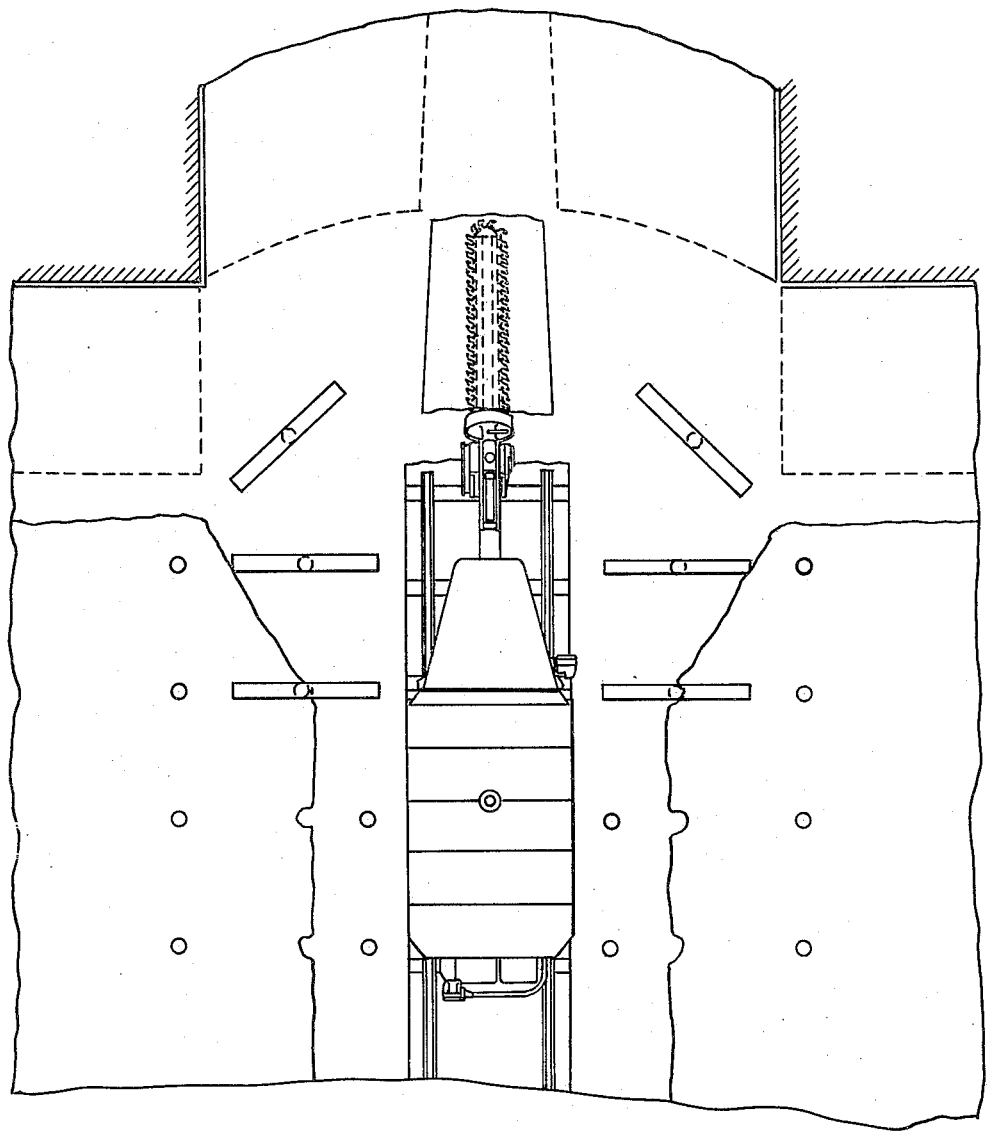
Figure 48 is a plan view of the mine chamber of Figure 47 as it appears at the conclusion of the slot-forming operations.

The vertical slot on the opposite side of the mine gallery is completed in a similar manner, thereby blocking out a large block of coal in the end of the mine gallery. This coal block may be further sub-divided, if necessary, in any desired manner by cutting additional slots in the way previously described as by cutting a plurality of vertical slots intermediate of and parallel to side wall slots. The individual blocks may then be detached from their rearward connections with the coal bank by using the expansible breaking device 457 inserted in a slot. Prior to breaking the block, a coal drag or pan may be placed in the undercut kerf under the block to receive it when it has been detached. Preferably, however, I employ the cutter blade itself for this purpose, as shown in Figure 48. The detached block may then be removed by dragging it out on the pan or cutter blade.

To utilize the machine in long-wall mining, the cutter blade is swung sidewise angularly until it occupies a position substantially at right angles to the longitudinal axis of the boom. This is done by releasing the brake band 129 which locks the cutter blade in position, by operating the brake control shaft 146 with a hand lever or crank, the brake being re-clamped when the desired position has been reached. The cutter blade is lowered to the floor level by operating the boom raising cylinders 60 and the cutter head tilting or deflecting cylinder 105. The sumping cut is now made into the side wall of the gallery by hydraulically anchoring the anchor jack cap 274 against the mine ceiling, and swinging the cutter blade into the side wall of the mine gallery by actuating the turntable swinging cylinders 29 and 30. When the sumping cut has been completed, the cutting of the long-wall horizontal slot may be accomplished by releasing the anchor jack cap 274 and moving the entire machine longitudinally through the operation of its transmission gearing. The cutter blade thereby cuts a slot at the floor level deep in the side wall of the mine gallery.

The long-wall top slot is cut in precisely the same manner as the bottom slot, after the cutter blade has been inverted by the use of the cutter head rotating cylinders 80 in the manner previously described in making the end wall overcut. The vertical or shearing slots in the side wall are also made in the same manner as the vertical slots in the end wall, namely, by rotating the cutter head through a quarter turn so that the cutter bar plane is vertical, and then operating the boom raising cylinders 60 and the cutter blade deflecting cylinder 105.

During its operation, the machine remains in an approximately balanced condition due to the careful arrangement of its respective parts to create such a balance. The boom is arranged at the forward end of the turntable, the transmission mechanism and pump near its pivot, and the motor and starting mechanism on a platform at the rearward side of the turntable. In this way the weight of the machine is effectively counterbalanced.

The improved methods of mining with the coal cutter of my invention differ radically from the conventional methods used with the coal mining machines of the prior art. The ordinary coal mining machine is merely the mechanical substitute for the hand mining by coal picks that was performed earlier in the development of the coal mining industry. Ordinarily these hand or machine "minings" were horizontal kerfs made in the face of the coal seam usually at or near the floor line, but occasionally in the top or at points intermediate of the seam. In addition to these "horizontal minings", "vertical minings" were made in some cases to better facilitate the removal of the coal. The purpose of either hand-made or machine-made "minings" has hitherto always been that of creating a cavity in the face of the coal seam to permit expansion of coal exposed to the blasting force of explosives used and to relieve the otherwise dangerous pressure acting against and tending to crush the sidewalls and roof of the working place. Due to the high expansibility of explosive gases, their pressure is exerted even after the coal has been dislodged. The degree of relief afforded depends upon the size of the "mining" which after more than fifty years of mining machine operations has become quite generally standardized at the width of six inches. No explosives, however, are used in my improved method of coal extraction, utilizing my present machine, hence no such expansive space is necessary. In contrast, the coal is dislodged by a hydraulic breaker pad inserted in the slot cut by my machine. The instant the coal is dislodged, the dislodging pressure ceases to act, because of the relative inexpansibility of the breaker pad liquid. My slot-forming and breaker pad system of mining thus introduces a new method.

Figures 46, 47, 48, 49, 50 and 51 show details of the application of my invention to the slot-forming system of mining. The system consists of dividing the face of the seam into relatively large blocks or cubes of coal to be subsequently, by means of my hydraulic pressure pad, dislodged and sufficiently fractured for convenient loading.

From Figure 46 it is obvious that to perform the slot-forming operations necessary to make this system of mining practical necessitates the use of a machine embodying flexibility and range, such as has not heretofore been provided in conventional wide-kerf mining machines. Furthermore, the cuttings or "fines" made by conventional wide-kerf mining machines are of a commercially undesirable size and difficult to dispose of even at prices much below the cost of production. This fact precludes the use of modified conventional wide-kerf mining machines for carrying out the extensive cutting operations necessary for dividing the seam into blocks according to my slot-forming system. Furthermore my slot-forming system involves the making of slots either horizontally or vertically at points longitudinal with or at an angle to the projected course of the working place, hence the function of cutting becomes quite different from that of conventional mining machines. My present coal cutter embodying greater flexibility, range and capacity to perform has been invented to meet these special needs which conventional machines cannot satisfy.

In the example shown in Figure 46 a number of positions of the cutter blade is illustrated as well as the application of my hydraulic breaker pad as provided for breaking down the coal. In this case the working face is advanced in steps in order to gain the roof protection afforded by the sidewings or steps of coal.

Figure 47:
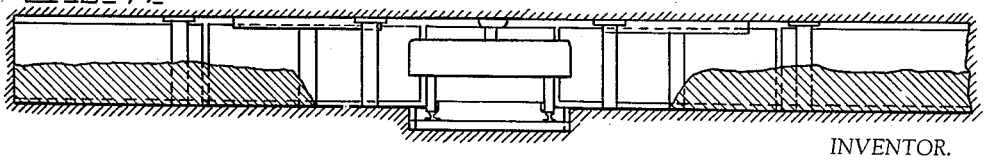
Figure 47 is a vertical cross section through the chamber of Figure 47 showing a relatively thin coal seam with my machine in place for mining chambers by cutting slots in the coal.

My coal cutter invention also provides means for cutting slots in the roof or floor for the quick and convenient dislodgment thereof through the use of my hydraulic breaker pad by the application of pressure to the slots thus formed. An example of this is illustrated in Figure 47, where the floor has been removed to provide head room as is sometimes required in extremely thin seams of coal. These slots are shown (Figure 46) in the floor near the face of the seam.

Figure 48 shows the manner in which the "key block" is withdrawn from the face while resting on the cutter blade. To perform this operation the cutter blade is thrust beneath the "key block" while the back end of the latter still remains attached to the coal seam. The block is conveniently dislodged by application of the breaker pad in the top slot. In some cases, however, the weight and gravitational leverage of the overhanging coal block itself, where the coal parts freely from the roof, makes the top slot unnecessary, in which case pressure is applied sidewise in the vertical slots to dislodge the cut blocks. After the "key block" has been dislodged the machine is propelled away from the face by its tractive effort and in so doing it withdraws the "key block". Figure 48 also shows the dislodged coal as it would appear after the application of pressure coming from the use of the hydraulic breaker pad.

Figure 49:
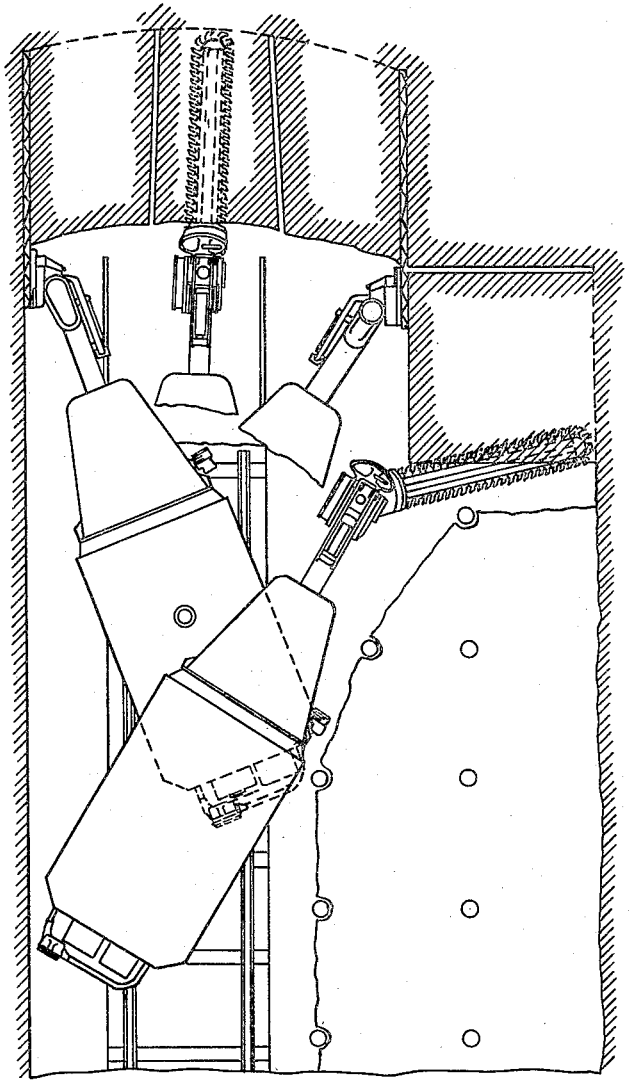
Figure 49 is a plan view showing the application of the machine of my invention to the mining of entries by slot-forming operations.

Figure 49 shows the application of my invention to a working face by so-called "pillar extraction". This is used where it is desired to carry the track on the side of the working face to permit the subsequent mining of the sidewall adjacent thereto.

Figure 51 shows a modified procedure wherein the wing blocks are removed in two following operations. The blocks are removed in the order according to the numbers as given.

In using my apparatus and method in connection with mechanical loading devices, and also as an optional procedure with hand loading, I have found it valuable to form the downwardly-directed diagonal slot 480 (Figure 1). This slot is cut by raising the boom and operating the head tilting mechanism. The downwardly-angled slot 480 approaches the horizontal lower slot at its backward end within the coal bank. The slots thus made serve to outline the upper and lower faces of a wedge-shaped block of coal. The main block of coal above this wedge-shaped block may then be detached from its rearward connection with the coal bank by employing the hydraulic breaker pad 457 deep within the upper horizontal slot, as previously described. The main block comes to rest on top of the wedge-shaped block, the latter being then removed by the loading machine, excavated by hand, or withdrawn by any convenient means, such as by a coal drag. When this is done, the main block then falls outward from the coal bank on to the floor of the mine chamber, either breaking itself up by its fall or else being easily broken up by hand or in connection with the operation of the mechanical loading machine. This procedure causes the block to fall outward into the mine chamber by its own action.

It will be understood that I desire to comprehend within my invention such modifications as may be necessary to adapt it to varying conditions and uses.

Having thus fully described my invention, what I claim as new and desire to secure by Letters Patent is:

1. In a mining apparatus, a support, a boom pivotally attached to said support to swing relative thereto, means comprising hydraulic cylinders for swinging said boom relative to said support and for supporting the boom in its adjusted position, said cylinders containing reciprocable pistons having piston rods, the latter pivotally connected to said boom on axes parallel to the boom pivot axis, a cutter head mounted on one end of said boom for rotation about the longitudinal axis of the boom, means for rotating said cutter head relative to said boom comprising hydraulic cylinders mounted on said boom each containing a reciprocable piston, and connections between said pistons and said cutter head, a cutter support pivotally mounted on said cutter head, a kerf cutter carried by said cutter support, and means for tilting said cutter support relative to said cutter head and for holding the cutter support in its adjusted position comprising a hydraulic cylinder mounted on said cutter head and containing a reciprocable piston, and connection between said piston and said cutter support including a pivot whose axis is parallel with the cutter support axis.

2. In a coal cutting machine, a swingable boom comprising an inner boom portion and an outer boom portion rotatably mounted relative to said inner boom portion around the longitudinal axis of said boom, a cutter supported by the outer boom portion, and means for rotating said outer boom portion relative to said inner boom portion, said boom rotating means comprising a drum attached to one of said boom portions, and a flexible connector passing around said drum, each end of said flexible connector being attached to a hydraulic cylinder, whereby actuation of said hydraulic cylinders by pressure fluid causes one of said boom portions to rotate relative to the other boom portion.

3. In a mining machine, a base, a turntable rotatably mounted on said base, a boom pivotally attached to said turntable, a kerf cutter pivotally attached to said boom, said boom comprising outer and inner portions rotatable relative to one another, means for electrically driving transmission devices operating said kerf cutter, means for mechanically advancing and retracting said base, hydraulic rams for rotating said turntable, hydraulic rams for lifting said boom relative to said turntable, hydraulic rams for rotating one portion of said boom relative to the other portion, a hydraulic ram for tilting said kerf cutter relative to said boom, and means for electrically driving means for supplying hydraulic pressure to said hydraulic rams.

4. In a mining apparatus, in combination, a portable base, a turntable on said base, a boom pivoted for elevation with respect to said turntable, a completely rotatable cutter head on the outer end of said boom, a kerf cutter pivotally mounted on said cutter head, means for yieldably supporting, adjusting and moving said kerf cutter comprising a fluid system embodying a source of fluid supply under pressure, fluid operated means for rotating said turntable, fluid operated means for elevating said boom about its pivot relative to said turntable, fluid operated means for rotating said cutter carrying head completely about its axis relative to said boom, and means for yieldably holding said kerf cutter in its angular position about its pivot with respect to said cutter head and yieldable to permit slippage of said cutter relative to said cutter head upon overloading of the cutter, and mechanically operated means for driving said kerf cutter in any of its positions.

5. In a mining apparatus, in combination, a portable base, a turntable on said base, a boom pivoted for elevation with respect to said turntable, a completely rotatable cutter head on the outer end of said boom, a kerf cutter pivotally mounted on said cutter head, means for yieldably supporting, adjusting and moving said kerf cutter comprising a fluid system embodying a source of fluid supply under pressure, fluid operated means for rotating said turntable, fluid operated means for elevating said boom about its pivot relative to said turntable, fluid operated means for rotating said cutter carrying head completely about its axis relative to said boom, and means for yieldably holding said kerf cutter in its angular position about its pivot with respect to said cutter head and yieldable to permit slippage of said cutter relative to said cutter head upon overloading of the cutter, mechanically operated means for driving said kerf cutter in any of its positions, and means for mechanically moving said apparatus bodily, and a common source of power for all of said fluid and mechanically operated means.

6. In a coal cutting machine, a pivoted tubular boom comprising an inner boom portion and an outer boom portion rotatably mounted relative to the inner boom portion around the longitudinal axis of the boom, a kerf cutter carried by said outer boom portion, means for rotating the outer boom portion relative to the inner boom portion, a motor for operating said rotating means for said outer boom portion, connections operated by said motor including shafting extending through said boom for driving said kerf cutter, and motor operated means operable independently of said shafting of said kerf cutter driving connections for swinging said boom about its pivotal axis.

7. In a coal cutting machine, a pivoted tubular boom comprising an inner boom portion and an outer boom portion rotatably mounted relative to the inner boom portion around the longitudinal axis of the boom, a kerf cutter carried by said outer boom portion, means for rotating the outer boom portion relative to the inner boom portion, a motor, connections operated by said motor including shafting extending through said boom for driving said kerf cutter, and means operated by said motor and operable independently of said shafting of said kerf cutter driving connections for swinging said boom about its pivotal axis and for effecting operation of said rotating means for said outer boom portion.

8. In a coal cutting machine, a horizontal turntable, an elongated tubular boom pivotally mounted at the forward edge of said turntable to swing in a vertical direction relative thereto, said boom comprising an inner boom portion and an outer boom portion rotatable relative to the inner boom portion about the longitudinal axis of the boom, a kerf cutter carried by said outer boom portion, a motor supported independently of said boom and relative to which said boom is swingable, connections driven by said motor including shafting extending through said boom for driving said kerf cutter, and means operated by said motor and independent of said shafting of said kerf cutter driving connections for swinging said boom about its pivot.

9. In a coal cutting machine, a horizontal turntable, an elongated tubular boom pivotally mounted at the forward edge of said turntable to swing in a vertical direction relative thereto, said boom comprising an inner boom portion and an outer boom portion rotatable relative to the inner boom portion about the longitudinal axis of the boom, a kerf cutter carried by said outer boom portion, a motor supported independently of said boom and relative to which said boom is swingable, connections driven by said motor including shafting extending through said boom for driving said kerf cutter, and means operated by said motor and independent of said shafting of said kerf cutter driving connections for swinging said boom about its pivot and for rotating said outer boom portion relative to said inner boom portion.

10. In a coal cutting machine, a pivoted tubular boom comprising an inner boom portion and an outer boom portion rotatably mounted relative to the inner boom portion around the longitudinal axis of the boom, a cutter support pivotally mounted on the outer extremity of said outer boom portion to swing relative thereto about an axis at right angles to the longitudinal axis of the boom, a kerf cutter carried by said swingable cutter support, means for rotating the outer boom portion relative to the inner boom portion, a motor for operating said rotating means for said outer boom portion, connections driven by said motor including shafting extending through said boom for driving said kerf cutter, and motor operated means operable independently of said shafting of said kerf cutter driving connections for swinging said boom about its pivotal axis.

11. In a coal cutting machine, a pivotal tubular boom comprising an inner boom portion and an outer boom portion rotatably mounted relative to the inner boom portion around the longitudinal axis of the boom, a cutter support pivotally mounted on the outer extremity of said outer boom portion to swing relative thereto about an axis at right angles to the longitudinal axis of the boom, a kerf cutter carried by said swingable cutter support, means for rotating the outer boom portion relative to the inner boom portion, a motor for operating said rotating means for said outer boom portion, connections driven by said motor including shafting extending through said boom for driving said kerf cutter, and motor operated means operable independently of said shafting of said kerf cutter driving connections for swinging said boom about its pivotal axis and for swinging said cutter support about its pivot relative to said outer boom portion.

12. In a coal cutting machine, a pivotal tubular boom comprising an inner boom portion and an outer boom portion rotatably mounted relative to the inner boom portion around the longitudinal axis of the boom, a cutter support pivotally mounted on the outer extremity of said outer boom portion to swing relative thereto about an axis at right angles to the longitudinal axis of the boom, a kerf cutter carried by said swingable cutter support, means for rotating the outer boom portion relative to the inner boom portion, a motor, connections driven by said motor including shafting extending through said boom for driving said kerf cutter, and means operated by said motor and operable independently of said shafting of said kerf cutter driving connections for swinging said boom about its pivotal axis and for swinging said cutter support about its pivot relative to said outer boom portion and for actuating said rotating means for said outer boom portion.

13. In a coal cutting machine, a pivoted tubular boom comprising an inner boom portion and an outer boom portion rotatably mounted relative to the inner boom portion around the longitudinal axis of the boom, a cutter support pivotally mounted on the outer extremity of said outer boom portion to swing relative thereto about an axis at right angles to the longitudinal axis of the boom, a kerf cutter carried by said swingable cutter support, means for rotating the outer boom portion relative to the inner boom portion, a motor for operating said rotating means for said outer boom portion, connections driven by said motor including shafting extending through said boom for driving said kerf cutter, motor operated means operable independently of said shafting of said kerf cutter driving connections for swinging said boom about its pivotal axis, and motor operated means operable independently of said shafting of said kerf cutter driving connections for swinging said cutter support about its pivot relative to said outer boom portion.

14. In a coal cutting machine, a horizontal turntable, an elongated tubular boom pivotally mounted near the forward edge of said turntable to swing in a vertical direction relative thereto, said boom comprising an inner boom portion and an outer boom portion rotatable relative to said inner boom portion about the longitudinal axis of the boom, a cutter support pivotally mounted on the outer extremity of said outer boom portion to swing relative thereto about an axis at right angles to the longitudinal axis of the boom, a kerf cutter carried by said cutter support, a motor supported independently of said boom and relative to which said boom is swingable, means operated by said motor for rotating said outer boom portion, connections driven by said motor including shafting extending through said boom for driving said kerf cutter, and motor operated means independent of said shafting of said kerf cutter driving connections for swinging said boom about its pivot.

15. In a coal cutting machine, a horizontal turntable, an elongated tubular boom pivotally mounted near the forward edge of said turntable to swing in a vertical direction relative thereto, said boom comprising an inner boom portion and an outer boom portion rotatable relative to said inner boom portion about the longitudinal axis of the boom, a cutter support pivotally mounted on the outer extremity of said outer boom portion to swing relative thereto about an axis at right angles to the longitudinal axis of the boom, a kerf cutter carried by said cutter support, a motor supported independently of said boom and relative to which said boom is swingable, means operated by said motor for rotating said outer boom portion, connections driven by said motor including shafting extending through said boom for driving said kerf cutter, and motor operated means independent of said shafting of said kerf cutter driving connections for swinging said boom about its pivot and for swinging said cutter support about its pivot relative to said outer boom portion.

16. In a coal cutting machine, a horizontal turntable, an elongated tubular boom pivotally mounted near the forward edge of said turntable to swing in a vertical direction relative thereto, said boom comprising an inner boom portion and an outer boom portion rotatable relative to said inner boom portion about the longitudinal axis of the boom, a cutter support pivotally mounted on the outer extremity of said outer boom portion to swing relative thereto about an axis at right angles to the longitudinal axis of the boom, a kerf cutter carried by said cutter support, a motor supported independently of said boom and relative to which said boom is swingable, connections driven by said motor including shafting extending through said boom for driving said kerf cutter, and means operated by said motor and independent of said shafting of said kerf cutter driving connections for swinging said boom about its pivot and for swinging said cutter support about its pivot relative to said outer boom portion and for rotating the outer boom portion relative to said inner boom portion.

17. In a coal cutting machine, a horizontal turntable, an elongated tubular boom pivotally mounted near the forward edge of said turntable to swing in a vertical direction relative thereto, said boom comprising an inner boom portion and an outer boom portion rotatable relative to said inner boom portion about the longitudinal axis of the boom, a cutter support pivotally mounted on the outer extremity of said outer boom portion to swing relative thereto about an axis at right angles to the longitudinal axis of the boom, a kerf cutter carried by said cutter support, a motor supported independently of said boom and relative to which said boom is swingable, connections driven by said motor including shafting extending through said boom for driving said kerf cutter, means operated by said motor and independent of said shafting of said kerf cutter driving connections for swinging said boom about its pivot, and means operated by said motor and independent of said shafting of said kerf cutter driving connections for swinging said cutter support about its pivot relative to said outer boom portion.

18. In a mining apparatus, a support, a cutter head rotatably mounted on said support, a kerf cutter supported by said cutter head, and means for rotating said cutter head relative to said support comprising means attached to said head and providing a cable engaging surface and a cable passing around said cable engaging surface, each end of said cable connected to a hydraulic motor of the reciprocating piston type whereby the actuation of said hydraulic motors by pressure fluid causes said head to rotate relative to said support.

19. In a mining apparatus, a support, a cutter head rotatably mounted on said support, a kerf cutter supported by said cutter head, and means for rotating said head relative to said support comprising a drum attached to said head, hydraulic cylinders mounted on said support, each containing a reciprocating piston having a rearwardly projecting piston rod, guide sheaves journaled on the rear ends of said piston rods, guide sheaves journaled on said support adjacent said drum, and a cable wound on said drum and passing around said guide sheaves, the ends of said cable fixed to said support.

20. In a mining apparatus, a portable base, an elongated boom pivotally mounted on the forward end of said base to swing in a vertical direction relative thereto and comprising a rear boom portion and a front boom portion mounted relative to said rear boom portion for rotation about the longitudinal axis of the boom, a kerf cutter supported by the front boom portion, a pair of hydraulic cylinders mounted on said rear boom portion and operatively connected to said front boom portion for rotating the latter, a pair of hydraulic cylinders pivotally mounted on the forward end of said base to swing in a vertical direction relative thereto and each containing a reciprocating piston, the pistons having forwardly projecting piston rods pivotally connected to the lower portion of the rear boom portion at the forward extremity thereof, and means for supplying fluid pressure to said cylinders to effect swinging of said boom in a vertical direction about its pivot and for rotating the front boom portion.

21. In a mining apparatus, a portable base, an elongated boom pivotally mounted on the forward end of said base to swing in a vertical direction relative thereto and comprising a rear boom portion and a front boom portion mounted relative to said rear boom portion for rotation about the longitudinal axis of the boom, a cutter support pivotally mounted on the forward extremity of said front boom portion to swing relative thereto about an axis at right angles to the longitudinal axis of the boom, a kerf cutter carried by said swingable cutter support, a pair of hydraulic cylinders mounted on said rear boom portion and operatively connected to the front boom portion for rotating the latter, a hydraulic cylinder mounted on said front boom portion and operatively connected to said cutter support for swinging the latter, and a pair of hydraulic lifting cylinders pivotally connected to the forward end of said base to swing in a vertical direction relative thereto and each containing a reciprocating piston, the pistons having forwardly projecting piston rods pivotally connected to the lower portion of the rear boom portion at the forward extremity thereof, and means for supplying fluid pressure to said cylinders for rotating said front boom portion, swinging said cutter support and swinging the boom in a vertical direction about its pivot.

22. In a mining apparatus, a frame, a cutter support pivotally mounted on said frame to swing relative thereto, a kerf cutter supported by said cutter support, and means for swinging said cutter support relative to said frame comprising a cylinder mounted on said frame and containing a reciprocating piston having a rearwardly extending piston rod, a trunnion block secured to the rear end of said piston rod, and parallel links extending longitudinally in parallel relation at opposite sides of the cylinder, said links pivotally connected at their rear ends to said trunnion block and at their forward ends to said cutter support.

23. In a mining machine, a portable base, an arm pivotally mounted on said base to swing in a vertical direction relative thereto, a cutter support pivotally mounted on the outer extremity of said arm to swing relative thereto about an axis at right angles to the longitudinal axis of said arm, and a kerf cutter carried by said cutter support to swing relative thereto about an axis at right angles to the support axis, said cutter support being swingable through a relatively wide range relative to said arm to move said kerf cutter into relatively inclined cutting planes from a position in a plane wherein the kerf cutter pivot is at right angles to the longitudinal axis of said arm to a position in a plane wherein the kerf cutter pivot is in coincidence with the longitudinal axis of said arm.

24. In a mining machine, a portable base, an arm pivotally mounted on said base to swing in a vertical direction relative thereto, a frame carried on the outer extremity of said arm to revolve relative thereto about an axis extending longitudinally of said arm, a cutter support pivotally mounted on said revolving frame about an axis at right angles to said frame axis, and a kerf cutter carried by said cutter support and swingable relative to the latter about an axis at right angles to the support axis, said cutter support being swingable through a relatively wide range relative to said revolving frame into relatively inclined cutting planes from a position wherein the kerf cutter pivot is at right angles to the revolving frame axis to a position wherein the kerf cutter pivot coincides with the frame axis.

25. In a mining apparatus, a support, a boom pivotally attached to said support to swing relative thereto, hydraulic cylinder and piston means for swinging said boom relative to said support and for supporting the boom in its adjusted position and comprising a cylinder containing a reciprocable piston having a piston rod, the latter pivotally connected to the boom on an axis parallel to the boom pivot axis, a cutter head mounted on the outer end of the boom for rotation about the longitudinal axis of the boom, means for rotating said cutter head relative to said boom comprising a hydraulic cylinder and piston means mounted on said boom and comprising cylinders each containing a reciprocable piston and connections between the pistons and the cutter head, a cutter support pivotally mounted on said cutter head, a kerf cutter carried by said cutter support, and means for tilting said cutter support relative to said cutter head and for holding said cutter support in its adjusted positions comprising a hydraulic cylinder and piston means mounted on said cutter head and comprising a cylinder containing a reciprocable piston and connection between said piston and said cutter support including a pivot whose axis is parallel with the cutter support pivot axis.

26. In a mining apparatus, a portable base, an elongated boom pivotally mounted on the forward end of said base to swing in a vertical direction relative thereto and comprising a rear boom portion and a front boom portion mounted relative to said rear boom portion for rotation about the longitudinal axis of the boom, a kerf cutter supported by the front boom portion, hydraulic cylinder and piston means mounted on said rear boom portion and operatively connected to said front boom portion for rotating the latter, hydraulic cylinder and piston means comprising a cylinder pivotally mounted on the forward end of said base to swing in a vertical direction relative thereto and containing a reciprocable piston, the piston having a forwardly projecting piston rod pivotally connected to the lower portion of the rear boom portion, and means for supplying fluid pressure to said cylinder and piston means to effect swinging of said boom about its pivot relative to said base and for rotating said front boom portion.

27. In a mining apparatus, a portable base, an elongated boom pivotally mounted on the forward end of said base to swing in a vertical direction relative thereto and comprising a rear boom portion and a front boom portion mounted relative to the rear boom portion for rotation about the longitudinal axis of the boom, a cutter support pivotally mounted on the forward extremity of said front boom portion to swing relative thereto about an axis at right angles to the longitudinal axis of the boom, a kerf cutter carried by said swingable cutter support, hydraulic cylinder and piston means mounted on said rear boom portion and operatively connected to the front boom portion for rotating the latter, hydraulic cylinder and piston means mounted on said front boom portion and operatively connected to said cutter support for swinging the latter, hydraulic cylinder and piston means comprising a cylinder pivotally connected to the forward end of said base to swing in a vertical direction relative thereto and containing a reciprocating piston, the piston having a forwardly projecting piston rod pivotally connected to the lower portion of the rear boom portion, and means for supplying fluid pressure to said hydraulic cylinder and piston means for rotating said front boom portion, swinging said cutter support about its pivot, and swinging the boom in a vertical direction about its pivot.

28. In a mining apparatus, a frame, a cutter support pivotally mounted on said frame to swing relative thereto, a kerf cutter supported by said cutter support, and means for swinging said cutter support about its pivot relative to said frame comprising a cylinder mounted on said frame and containing a reciprocating piston having a projecting piston rod, a trunnion block secured to the outer end of said piston rod, and parallel links extending longitudinally in parallel relation at opposite sides of said cutter support and pivotally connected at their rear ends to said trunnion block and at their forward ends to said cutter support.

JOSEPH F. JOY.